(12) United States Patent
Qi et al.

(10) Patent No.: US 12,417,705 B2
(45) Date of Patent: *Sep. 16, 2025

(54) METHOD AND SYSTEM FOR VEHICLE CRASH PREDICTION USING MULTI-VEHICLE DATA

(71) Applicant: Cambridge Mobile Telematics Inc., Cambridge, MA (US)

(72) Inventors: Yuting Qi, Lexington, MA (US); Rizki Syarif, Lexington, MA (US); Edward J. Gramer, Dover, MA (US); Cornelius F. Young, Needham, MA (US)

(73) Assignee: Cambridge Mobile Telematics Inc., Cambridge, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/734,546

(22) Filed: Jun. 5, 2024

(65) Prior Publication Data
US 2024/0321098 A1     Sep. 26, 2024

Related U.S. Application Data

(63) Continuation of application No. 17/691,963, filed on Mar. 10, 2022, now Pat. No. 12,020,571.

(60) Provisional application No. 63/165,659, filed on Mar. 24, 2021, provisional application No. 63/159,948, filed on Mar. 11, 2021.

(51) Int. Cl.
*G08G 1/16*     (2006.01)

(52) U.S. Cl.
CPC ..................... *G08G 1/16* (2013.01)

(58) Field of Classification Search
None
See application file for complete search history.

(56) References Cited

U.S. PATENT DOCUMENTS

| | | |
|---|---|---|
| 6,502,033 B1 | 12/2002 | Phuyal |
| 10,106,156 B1 | 10/2018 | Nave et al. |
| 10,460,534 B1 * | 10/2019 | Brandmaier ........... G07C 5/008 |
| 11,884,225 B2 | 1/2024 | Qi et al. |
| 2008/0234925 A1 | 9/2008 | Lo |

(Continued)

OTHER PUBLICATIONS

U.S. Appl. No. 17/506,566, "Notice of Allowance", Aug. 30, 2023, 8 pages.

(Continued)

*Primary Examiner* — John F Mortell
(74) *Attorney, Agent, or Firm* — Kilpatrick Townsend & Stockton LLP

(57) ABSTRACT

Techniques described herein provide for methods and systems for vehicle crash prediction using multi-vehicle data. In one example, a method includes receiving event data for events identified by devices disposed in a plurality of vehicles from movements of the vehicles collected by the devices. For each pair of events, a degree of alignment is determined and used to identify candidate pairs of events. For each candidate pair of events, single event detection features are extracted and input into a crash prediction model to determine a crash correlation probability for whether both events correspond to a same crash event. Based on the probability, an indication of the same crash event is transmitted to a remote server associated with either or both vehicles involved in the crash event.

20 Claims, 21 Drawing Sheets

(56) References Cited

U.S. PATENT DOCUMENTS

| | | |
|---|---|---|
| 2011/0264395 A1 | 10/2011 | Smith et al. |
| 2014/0278206 A1 | 9/2014 | Girod et al. |
| 2015/0300827 A1 | 10/2015 | Malalur et al. |
| 2017/0101093 A1 | 4/2017 | Barfield et al. |
| 2020/0001865 A1 | 1/2020 | Stobbe et al. |
| 2020/0115863 A1 | 4/2020 | Kozloski et al. |
| 2020/0257308 A1 | 8/2020 | Herman |
| 2021/0049837 A1 | 2/2021 | Karnik et al. |
| 2021/0110716 A1 | 4/2021 | Becker et al. |
| 2021/0287459 A1 | 9/2021 | Cella et al. |
| 2021/0289331 A1* | 9/2021 | Gotoh .................. G08G 1/0133 |
| 2022/0017032 A1 | 1/2022 | Qi et al. |
| 2022/0019924 A1 | 1/2022 | Lewin et al. |
| 2022/0092349 A1 | 3/2022 | Yang |
| 2022/0118931 A1 | 4/2022 | Qi et al. |
| 2022/0292974 A1 | 9/2022 | Qi et al. |

OTHER PUBLICATIONS

U.S. Appl. No. 17/691,963, "Non-Final Office Action", Nov. 22, 2023, 14 pages.
U.S. Appl. No. 17/691,963, "Notice of Allowance", Feb. 28, 2024, 10 pages.
U.S. Appl. No. 18/522,009, "Non-Final Office Action", Mar. 19, 2024, 7 pages.
Lee, et al., "Collision Warning Timing, Driver Distraction, and Driver Response to Imminent Rear-End Collisions in a High-Fidelity Driving Simulator", Human factors, vol. 44, No. 2 Available Online At: https://journals.sagepub.com/doi/pdf/10.1518/0018720024497844, Jun. 1, 2002, pp. 314-334.
PCT/US2021/055896, "International Preliminary Report on Patentability", May 4, 2023, 6 pages.
PCT/US2021/055896, "International Search Report and Written Opinion", Jan. 27, 2022, 7 pages.
PCT/US2022/019815, "International Preliminary Report on Patentability", Sep. 21, 2023, 11 pages.
PCT/US2022/019815, "International Search Report and Written Opinion", Jun. 10, 2022, 12 pages.
U.S. Appl. No. 18/522,009, "Notice of Allowance", Jun. 26, 2024, 5 pages.
EP21883829.0, "Extended European Search Report", Feb. 4, 2025, 15 pages.
EP22768016.2, "Extended European Search Report", Feb. 13, 2025, 10 pages.
EP22811991.3, "Extended European Search Report", Apr. 11, 2025, 10 pages.

* cited by examiner

FIG. 9A

FIG. 9B

METHOD AND SYSTEM FOR VEHICLE CRASH PREDICTION USING MULTI-VEHICLE DATA

CROSS-REFERENCE TO RELATED APPLICATIONS

This application is a continuation of U.S. patent application Ser. No. 17/691,963, filed on Mar. 10, 2022, entitled "Method and System for Vehicle Crash Prediction Using Multi-Vehicle Data, which claims priority to U.S. Provisional Patent Application No. 63/159,948, filed on Mar. 11, 2021, entitled "Method and System for Vehicle Crash Prediction;" and U.S. Provisional Patent Application No. 63/165,659, filed on Mar. 24, 2021, entitled "Method and System for Vehicle Crash Prediction Using Multi-Vehicle Data," the disclosures of which are hereby incorporated by reference in their entirety for all purposes. This application is related to U.S. patent application Ser. No. 17/506,566, filed on Oct. 20, 2021, entitled "Methods and Systems for Point of Impact Detection," the disclosure of which is hereby incorporated by reference in its entirety for all purposes.

BACKGROUND OF THE INVENTION

Vehicle crash prediction generally refers to automatic detection of the occurrence of a vehicle crash/crash event. Vehicle crash prediction can be performed during or after the vehicle crash event. Vehicle crash prediction can be performed to support various applications, such as reporting to emergency services to speed up rescue operations, authenticating a reported vehicle crash event and the resulting injuries and damages (e.g., for insurance claims), reconstruction of the sequence of events leading to the vehicle crash event to support investigation efforts, etc.

Vehicle crash prediction can be performed based on various types of data, such as motion data, location data, audio data, image/video data of vehicles involved in the collision, and reporting by the drivers of the vehicles and/or by other individuals (e.g., witnesses), among other types of data. One challenge of vehicle crash prediction is to improve the accuracy of prediction, namely, to reduce the likelihood of taking unnecessary actions (e.g., emergency reporting) based on a false prediction of a vehicle crash event when such an event has not occurred. Despite the progress made in the area of vehicle crash prediction, there is a need in the art for improved methods and systems related to vehicle crash prediction.

SUMMARY OF THE INVENTION

Embodiments of the present invention generally relate to predicting a vehicle crash event, and more particularly, to predicting a vehicle crash event based on data from two or more mobile devices.

According to an embodiment of the present invention, a method is provided. The method includes receiving, from a first mobile device associated with a first vehicle, first data related to a first event involving the first vehicle; receiving, from a second mobile device associated with a second vehicle, second data related to a second event involving the second vehicle; determining, based on the first data and the second data, whether the first event and the second event correspond to the same crash event; and performing one or more actions based on whether the first event and the second event correspond to the same crash event.

Another aspect of the present disclosure includes a system comprising one or more processors and a non-transitory, computer-readable medium storing instructions, which when executed by one or more processors, cause the one or more processors to perform the method described above.

Another aspect of the present disclosure includes a non-transitory, computer-readable medium storing instructions, which when executed by one or more processors, cause one or more processors to perform the method described above.

Another aspect of the present disclosure includes a non-transitory computer readable medium storing instructions that, when executed by a hardware processor, causes the hardware processor to receive, from a first mobile device associated with a first vehicle, first data related to a first event involving the first vehicle, the first data indicating a point-of-impact of the first vehicle in the first event. The instructions further causes the hardware processor to receive, from a second mobile device associated with a second vehicle, second data related to a second event involving the second vehicle. The instructions further causes the hardware processor to determine, based on the first data and the second data, whether the first event and the second event correspond to the same crash event. The instructions further causes the hardware processor to perform one or more actions based on whether the first event and the second event correspond to the same crash event.

Numerous benefits are achieved by way of the various embodiments over conventional techniques. For example, embodiments of the present invention provide improvements over crash prediction based on data collected by a single mobile device in a vehicle, since it may be difficult to independently verify the prediction before taking an action based on the prediction (e.g., emergency reporting). On the other hand, embodiments of the single event crash prediction system described herein can determine a degree of alignment of various characteristics (e.g., times and locations) of multiple predicted crash events based on data reported by two different mobile devices located in two different vehicles, and predict whether the set of predicted crash events correspond to the same, single crash event involving the multiple vehicles. Such arrangements allow independent verification of one predicted crash event against another. Moreover, given that it utilizes, for example, a certain degree of alignment in: space and/or time, travel direction, point-of-impacts, etc., between the multiple crash events for them to be considered as the same crash event, the likelihood of falsely predicting two crash events as the same crash events is low, since two falsely predicted crash events are unlikely to align in time, space, and/or travel direction, point of impact, or the like. Accordingly, embodiments of the present invention can improve the accuracy of the vehicle crash prediction in order to ensure that subsequent actions taken based on the prediction are appropriate and warranted.

Embodiments of the present invention can also improve various aspects in vehicle insurance operations performed by the insurance carriers. Specifically, by correlating two crash events as the same crash event, and by providing independent verification of one predicted crash event versus the other, the likelihood of an insurance carrier accepting fraudulent insurance claims based on falsified crash reports can be reduced. Moreover, embodiments of the present invention can provide access to the data of the vehicles involved in the crash to the claim adjusters representing each insured party's respective insurance carrier, without requiring the claim adjusters to contact the drivers for the data. Such arrangements can speed up handling of the crash event and any subsequent claims. Moreover, the data collected using the mobile devices in the vehicles can also be made available for crash scene reconstruction, witness identification, claim automation, etc., and to predict the likelihood and severity of injuries, monetary damage, and prevent potential fraud. Thus, embodiments of the present invention streamline the handling of crash events as well as vehicle insurance operations as a whole.

These and other embodiments of the present invention, along with many of its advantages and features, are described in more detail in conjunction with the text below and attached figures.

BRIEF DESCRIPTION OF THE DRAWINGS

Aspects and features of the various embodiments will be more apparent by describing examples with reference to the accompanying drawings, in which:

FIGS. 9A-9B illustrate examples of a web portal supported by a vehicle crash prediction system according to some aspects of the present disclosure.

DETAILED DESCRIPTION OF SPECIFIC EMBODIMENTS

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

Figure 1:
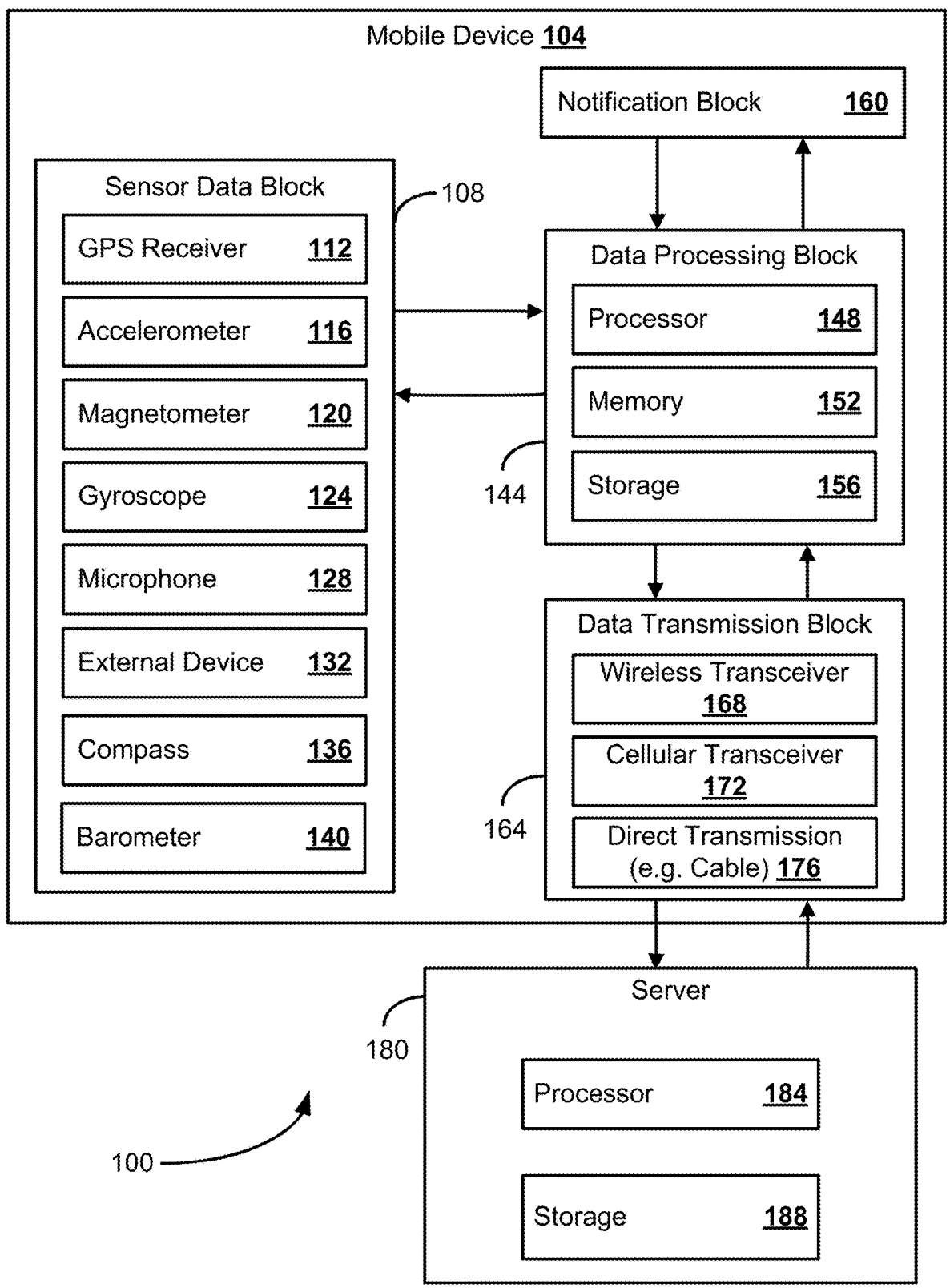
FIG. 1 is an exemplary block diagram illustrating a system for collecting driving data according to some aspects of the present disclosure.

FIG. 1 is an exemplary block diagram illustrating a system 100 for collecting driving data according to some embodiments. System 100 includes a mobile device 104 which includes a plurality of processing, sensor, and communication resource components. Mobile device 104 may include a sensor data block 108, a data processing block 144, a data transmission block 164, and optionally a notification block 160. The sensor data block 108 includes data collection sensors as well as the data collected from sensors that is available to mobile device 104. This can include external devices connected via Bluetooth, universal serial bus (USB) cable, etc. The data processing block 144 may include storage 156 which may include data from the sensors of the sensor data block 108 processed by processor 148. This may include, but is not limited to, analyzing, characterizing, manipulating, smoothing, subsampling, filtering, reformatting, etc. Examples of mobile devices include, but are not limited to, smartphones, tablets, laptops, application specific integrated circuits (ASICs), and the like. In some examples, data processing block 144 can be in a server of a cloud infrastructure that can communicate with mobile device 104.

Data transmission block 164 may process communications (e.g., transmitted and received communications) such as the processed sensor data transmitted to an external computing device (e.g., server 180). Data transmission block 164 may include wireless transceiver 168, cellular transceiver 172, and/or direct transmission 176 (e.g., a cable). The external computing device may also store and/or process the data obtained from sensor data block 108. Server 180 may include its own processor 184 and storage 188.

Notification block 160 may report the results of analysis of sensor data performed by the data processing block 144 to a user of the mobile device 104 via a display (not shown).

For example, notification block 160 may display or otherwise present a warning communication to a user of the mobile device 104 upon determining that that the user may be a distracted driver. In some examples, the physical interaction determination may be a process executed by processor 148 of mobile device 104. In other examples, the physical interaction determination may be a process executed by processor 184, as described further herein with respect to FIG. 2.

Some embodiments are described using examples where driving data is collected using mobile device 104, and these examples are not limited to any particular electronic device. For example, electronic devices may include a variety of devices that be included within or connected to mobile device 104. Examples of electronic devices include, but is not limited to, devices with one or more of location determination systems such as global positioning system (GPS) receivers 112, accelerometers 116, magnetometers 120, gyroscopes 124, microphones 128, external (sensor) devices 132, compasses 136, barometers 140, communications capabilities, and the. Exemplary electronic devices include smart watches, fitness monitors, Bluetooth headsets, tablets, laptop computers, smart phones, music players, movement analysis devices, and the like. The sensor data can indicate a state of motion of the vehicle as well as an event (e.g., a crash event) that has occurred. For example, GPS receiver, accelerometer, magnetometers, and gyroscopes can indicate a speed of the vehicle, a direction of travel of the vehicle, a location of the vehicle, etc. Moreover, the barometer can output data for determination of airbag deployment as well as the mobile device's position relative to ground, both of which can be used to detect the occurrence of an event. Further, certain audio data from the microphone (e.g., a loud bang sound) can also be indicative of a crash event.

One or more sensors of mobile device 104 (e.g., the sensors of sensor data block 108) may be operated to collect measurements to provide an indication as to physical interaction with the mobile device 104. In some examples, the measurements may be collected at time when the electronic device is likely to be with the driver when operating a vehicle, such as when the device is moving with a particular speed or when the device is located on a known road (e.g., a highway). The sensors used to collect data may be components of the mobile device 104, and use power resources available to mobile device 104 components (e.g., mobile device battery power and/or a data source external to mobile device 104).

In some examples, settings of a mobile device may be used to enable different functions described herein. For example, an operating system (OS), such as Apple IOS, Android OS, and/or wearable device operating systems having certain settings enabled can enable certain functions of examples. In some examples, having location services enabled allows the collection of location information from the mobile device (e.g., collected by global positioning system (GPS) receiver 112), and enabling the background app refresh allows some embodiments to execute in the background, collecting and analyzing driving data even when the application is not executing. In some instances, location information may be determined by other sensors of the mobile device, such as by tracking movement of the mobile device (e.g., using an accelerometer), by receiving location information from an external source, radio triangulation (e.g., using cellular, Bluetooth, or Wi-Fi radios), by an IP address of the mobile device, or by other means. In some implementations, alerts are provided or surfaced using notification block 160 while the app is running in the background since the physical can be performed in the background.

Figure 2:
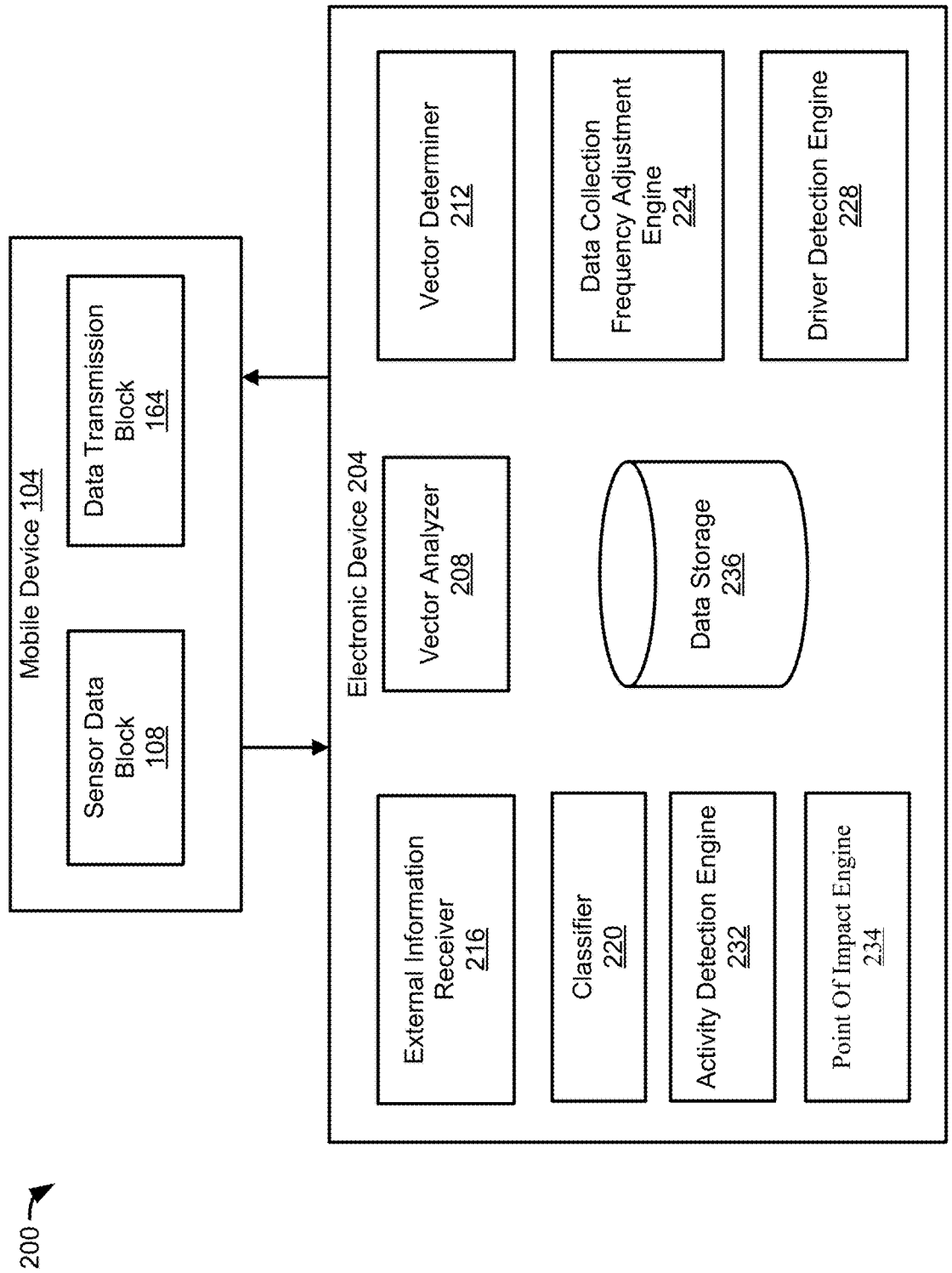
FIG. 2 is a simplified block diagram illustrating an example of another system for collecting driving data according to some aspects of the present disclosure.

FIG. 2 is a simplified block diagram illustrating an example of another system 200 for collecting driving data according to some aspects of the present invention. System 200 may include electronic device 204, which may be incorporated within mobile device 104 (e.g., as specialized hardware or software) or may be a separate device (or execute on a separate device) that communicates with the mobile device 104. For instance, as a separate device electronic device 204 may be a mobile device (e.g., such as mobile device 104 of FIG. 1, a similar type of mobile device, a different type of mobile device, or the like), a server, a computing device such as desktop or laptop computer, a specialized processing device (e.g., such as one or more application specific integrated circuits, field programmable gate arrays, or the like), a distributed processing system (e.g., such a cloud environment or the like), a combination thereof (e.g., as a distributed process), or the like. In some embodiments, the electronic device 204 may provide functionality using components including, but not limited to: a vector analyzer 208, a vector determiner 212, an external information receiver 216, a classifier 220 (e.g., a machine learning model), a data collection frequency adjustment engine 224, a driver detection engine 228, activity detection engine 232, and point-of-impact engine 234. Each component may include one or more processors (not shown) and memory (not shown). Instructions stored in the memory of a component may be executed by the one or more processors of the component to provide the functionality of the component. Alternatively, one or more processors of electronic device 204 (not shown) may execute instructions stored in a central memory of electronic device 204 to provide the functionality of the components. The electronic device 204 may also include a data storage 236. In some instances, one or more of the components 208-232 operating on electronic device 204 may be stored memory 152 or storage 156 of mobile device 104, and/or executed by processor 148 of mobile device 104.

One or more sensors of mobile device 104 (e.g., sensors of sensor data block 108) are used to measure characteristics of an environment in which the mobile device is positioned. For instance, the one or more sensors are used to collect characteristics of a vehicle while the mobile device is positioned in the vehicle during a drive. In that instance, the one or more sensors may be operated while the mobile device is positioned proximate to a driver during a time interval that corresponds to when the driver is operating the vehicle. As used herein, the terms "drive" and "trip" refer to the operation of a vehicle over an interval of time. Measurements obtained from the one or more sensors may be analyzed to determine acceleration vectors for the vehicle, as well as different features of the drive. In some instances, external data (e.g., weather, traffic, vehicle information, driver information) can be retrieved and correlated with collected driving data.

In some embodiments, a display of a mobile device (such as mobile device 104) can show representations of driving data collected by the one or more sensors or generated by any of components 208-232. For instance, representations of driving data can be generated by transforming collected sensor data (e.g., driving data collected using sensor data block 108) into different results, including, but not limited to, estimates of an activity of a user of mobile device 104 (e.g., stationary, walking, running, driving), estimates of the occurrence of different driving events during a drive for which data was collected, a metric descriptive of the driving behavior of a driver during the drive, a metric descriptive of the overall driving behavior of a driver for all drives, a metric descriptive of a driver's behavior as related to the occurrence of certain events, and/or a combination of transformed driving data and geographic data.

In some instances, collected driving data can be analyzed to assign scores to a drive, multiple drives, a driver, and/or driving behavior based on different criteria. A scoring engine (not shown) may aggregate data collected by the one or more sensors and apply one or more rules to generate scores for the embodiments. Further disclosure regarding scoring can be found in U.S. Pat. No. 11,072,339, issued on Jul. 27, 2021, entitled "SYSTEMS AND METHODS FOR SCORING DRIVING TRIPS", hereby incorporated by reference in its entirety.

Sensor data (e.g., collected using the sensor data block 108) may be used to analyze movement of the mobile device to detect the occurrence of driving events. The sensor data may be aggregated by electronic device 204 and analyzed once a predetermined amount of the sensor data is received. For example, once the electronic device 204 aggregates 50 megabytes of sensor data, the electronic device 204 may initiate an analysis of the sensor data. In another example, the electronic device 204 may initiate an analysis of the sensor data once electronic device 204 receives sensor data collected over a predetermined interval (e.g., a half hour of sensor data, an hour of sensor data, etc.). In still yet another example, the electronic device 204 aggregates sensor data associated with a drive and analyzes the sensor data once all of the sensor data associated with the trip is received. Alternatively, mobile device 104 includes one or more of components 208-232 and provides analysis of sensor data in real time (e.g., as the one or more sensors obtain measurements).

A GPS receiver may provide time stamped location and speed data that can be used by various applications executing on the mobile device. The time stamped data can be used to accurately determine vehicle location and speed. A GPS receiver may detect a crash and determine a distance travelled by the vehicle. For instance, GPS receiver may detect a crash by detecting sudden changes in speed or location. However, since mobile devices operate with limited resources due to power and processing constraints and due to the high power consumption of operating a GPS receiver, electronic device 204 may use the one or more other sensors of mobile device 104 to detect vehicle location and/or speed.

For instance, a mobile device positioned in a vehicle experiences mechanical vibrations related to the activity of the vehicle. These vibrations are measurable using a subset of the sensors in the sensor data block 108 of mobile device 104 referred to as an inertial measurement unit (IMU). The measurements of the mechanical vibration can occur at varying amplitudes and frequencies, which can be used to identify the vehicle activity or in some cases activity of the user. For example, some or all of the accelerometer, gyroscope, and magnetometer measurements may distinguish walking patterns of the user from driving patterns of the vehicle (e.g., vehicle speed of approximately 5 m/s).

The IMU may include any of the accelerometer 116, the gyroscope 124, and the magnetometer 120. The IMU and the sensors included within may be a separate unit from a GPS receiver. The accelerometer 116 may be a three-axis accelerometer operable to measure longitudinal and lateral acceleration as well as acceleration due to gravity. The gyroscope 124 and the magnetometer 120 may also be three-axis devices and may measure angular rotation and magnetic heading, respectively, in three dimensions. The IMU may combine the three-dimensional accelerometer data with the three-dimensional gyroscopic data to identify movement of the mobile device with six degrees of freedom (DOF) (e.g., translation and rotation).

In some instances, data obtained from the IMU can be filtered and used as input to train a classifier such as classifier 220, to predict vehicle speed. An example of such a classifier includes, but is not limited to, an XGBoost classifier. The classifier may be trained using features extracted from training data of a large number of driving trips. The extracted training features may include statistical features of the driving data, for example, median, variance, and maximum values of the IMU signals (e.g., accelerometer, gyroscope, and magnetometer signals). In some instances, the orientation of the mobile device with respect to gravity may be determined and input to the classifier for training. Other statistical features may be used without departing from the scope of the present invention.

During a drive with a mobile device positioned in a vehicle, the IMU of the mobile device may be used to obtain movement measurements from any of the accelerometer, the gyroscope, and the magnetometer, and the movement measurements to generate an input for a classifier to predict vehicle speed. In some instances, the acceleration measurements used in the prediction of vehicle speed may be user acceleration measurements. User acceleration measurements may be acceleration measurements for which the gravity component of acceleration has been removed. In some instances, the acceleration measurements used in the prediction of vehicle speed may be raw acceleration measurements. Raw acceleration measurements may be acceleration measurements that include the gravity component.

The movement measurement signals from the IMU sensors may be sampled at a specified sampling rate to obtain digital signals. In some instances, a 9 Hz sampling rate may be used for the movement measurement signals. In other instances, a 30 Hz sampling rate may be used for the movement measurement signals. Other sampling rates, for example, 50 Hz or another sampling rate may be used. Higher sampling rates can provide improved speed estimation at the cost of increased resource consumption (e.g., processing and/or power resources). Electronic device 204 and/or mobile device 104 may modulate IMU sensor sampling in real time to optimize the volume of data collected (e.g., for accuracy of data analysis) and the resource consumption.

For instance, if the mobile device is connected to a reliable power source (e.g., such as the vehicle's power supply), the movement measurement signals may be sampled at a highest frequency (e.g., 50 Hz or a predetermined highest frequency). If the mobile device is not connected to a power source, the movement measurement signals may be sampled at a lower frequency (e.g., 30 Hz sampling or a predetermined medium frequency). If the power supply of the mobile device is below a threshold value (e.g., 25% of maximum), then the sampling of the movement measurement signals may be reduced to a lower frequency (e.g., 9 Hz or a predetermined low frequency) to conserve the remaining power of the mobile device. In some instances, the sampling rate of the movement measurement signals may be modified to improve the speed estimation. For instance, an accuracy metric may be used to indicate a likelihood that a given speed estimation is valid. If the accuracy metric does not exceed a threshold, the sampling rate of the movement measurement signals may be temporarily or permanently increased until the accuracy metric exceeds the threshold. The mobile device may modulate the sampling rate in real time based on the operating conditions (e.g., resource consumption) of the mobile device or the metric.

Filtered IMU signals, can distinguish driving, stopping, and user walking patterns. A bandpass filter (e.g., implemented in hardware or software), for example, an infinite impulse response (IIR) filter, may be used to filter the IMU signals to isolate frequencies indicative of various vehicle activities and to remove signal magnitude values exceeding a specified threshold. Portions of the signals having magnitude values exceeding the specified threshold may be excluded from further bandpass filtering. The digital bandpass filters can be designed to isolate the amount of vibration (i.e., frequencies) occurring within specific frequency ranges of interest. For example, the amount of vibrations may be separated into frequency ranges from 0.2 Hz to 1.1 Hz, from 1.1 Hz to 2.0 Hz, etc., depending on the sampling frequency, by bandpass filtering the signals.

Changes in lower frequency bands, for example up to approximately 1 Hz, may contain information about the vehicle stopping, while changes in higher frequency bands may correspond to the vehicle driving at higher speeds. The sources of the vibrations detected by the IMU sensors are complex interactions between engine vibrations resulting from speed changes, vibrations due to the vehicle interacting with the road surface at different speeds). A machine-learning model (e.g., the classifier) can learn these more complex interactions, which can be a combination of high and low frequencies, which correspond to each vehicle behavior.

In some instances, IMU sensor signals having large magnitudes may be disruptive to the vehicle speed prediction. In those instances, filtering may exclude the large magnitude signals. For example, accelerometer signal magnitude values exceeding a threshold value of about 10 m/s$^2$ or another threshold value, as well as any subsequent portions of the signal, may be excluded. The portions of the IMU signals up to, but not including, the signal magnitude values exceeding the threshold value may be bandpass filtered using the IIR filter.

The IIR filtering process may employ forward-backward filtering in which the portions of the IMU signals are filtered normally (i.e., forward filtering), and the forward filtered signals are "flipped" in time and filtered again with the IIR filter (i.e., backward filtering) producing a squared amplitude response. The IIR filters can better isolate the signals of interest and minimize or eliminate nonlinear phase distortion of the signals. The IIR filters are applied recursively, such that the result of the last step of the filter algorithm is applied to the next step. IIR filtering methods may be more computationally efficient than filtering methods that utilize computation of all intermediate numerical quantities that lead to the result (e.g., Fourier transforms). IIR filters are also advantageous because they can isolate frequency ranges of interest with greater signal amplitude attenuation outside of a range of interest. In some implementations, a finite impulse response (FIR) filter, rather than an IIR filter, may be used for bandpass filtering of the IMU signals.

The number of frequency bands used for the bandpass filtering may be determined by the desired granularity and the sampling frequency of the sensor data. For example, 14 passbands may be used in equally spaced 0.3 Hz frequency bands from 0.2 Hz to a Nyquist sampling frequency of 4.5 Hz for data obtained using a 9 Hz sampling, and 28 passbands may be used from 0.2 Hz to 15 Hz for data obtained using a 30 Hz data. More granular frequency bands may be used when the IMU signals are sampled at higher sampling frequencies. Selection of the number and width of the frequency bands may be determined based on the desired signal quality in each band and the granularity of the information. For example, too many frequency bands can result in degraded signal quality due to the narrow bandwidth, while too few frequency bands may result in loss of granularity of the captured information.

Features, for example statistical features, may be extracted from some or all of the filtered signals. The features used as inputs to classifier 220 can be summary statistics (e.g., median, variance, and maximum) over the various signals, covering different time spans. The features may be extracted from time windows of different lengths. In some implementations, each of the statistical features may be extracted from the IMU signals over a 5-second time window, a 10-second time window, and a 20-second time window. Each window may be centered at the time point under consideration. Over each of the windows, summary statistics such as the mean, median, variance, maximum, and minimum of the various band-passed versions of the IMU sensor signals (e.g., accelerometer, gyroscope) contained in these windows can be calculated.

The different length windows may provide levels of stability for the feature values, with longer window times producing more stable feature values. Other window lengths or a different number of windows may be used without departing from the scope of the invention. For example, in some implementations, a single window may be used. For a bandpass filtered accelerometer signal between 0.2 Hz to 1.1 Hz, nine features may be extracted, e.g., median, variance, and maximum, with each feature extracted over a 5-second time window, a 10-second time window, and a 20-second time window. The feature extraction produces a single list of values (e.g., a feature vector) for each time point under consideration.

The extracted features (e.g., the feature vectors) may be input to the classifier. The machine learning model (e.g., the classifier) can then make a speed prediction based on the feature vector inputs. The vehicle speed prediction by the classifier may be quantized, for example, in increments of 5 m/s or another increment. In some implementations, the orientation of the mobile device with respect to gravity may be determined and input to the classifier.

Activity detection engine 232 identifies an activity that corresponds to sensor measurements received from the one or more sensors of sensor data block 108. For instance, the activity detection engine 232 identifies: when mobile device 104 is stationary, with a user who is walking, with a user who is running, with a user who is riding bicycle, in a vehicle that is driving, in a vehicle that is flying, and the like. In some instances, activity detection engine 232 outputs a probability of the activity. In those instances, activity detection engine 232 may output more than one probability such as a 45% probability that the mobile device is walking, a 33% probability that mobile device is driving, and a 22% probability of some other activity. The probability may be expressed as an integer or real number, a percentage, a grade (such as a low, medium, or high), or in any way that represents the probability of a given activity.

Activity detection engine 232 may use the activity to detect drives from sensor data. For instance, activity detection engine 232 may analyze the data received from mobile device 104 and identify a first time when the activity indicates a high probability that mobile device 104 is in a car that is driving. Activity detection engine 232 may identify a second time after the first time in which there is a high probability another activity (e.g., stationary, walking). Activity detection engine 232 then defines a drive as occurring from the first time to the second time. Other components of electronic device 204 may then further analyze the sensor data received between the first time and the second time to identify driver behavior, driver score, crash detection, speed estimation, etc. In some instances, activity detection engine 232 or any of the operations described in connection with the activity detection engine 232 may be performed by an operating system of the mobile device to manage data collection by sensor data block 108.

In some instances, activity detection engine 232 may operate on mobile device 104 to control collection of measurements from sensor data block 108. Mobile device 104 may execute a data collection application that controls the operation of the one or more sensors of mobile device 104 (e.g., such as sampling rates and the like) and collects measurements from the one or more sensors. The data collection application can include one or more of the components 208-232. Since the mobile device operates with limited resources, the data collection application may be suspended or terminated by the user of the mobile device, due to inactivity of the data collection application, when the mobile device is at rest, or the like. Activity detection engine 232 may operate in a background process to detect if a drive is occurring. If a drive is occurring, activity detection engine 232 may cause the data collection application to be initiated and begin collection of sensor data associated with the drive.

In some instances, activity detection engine 232 may generate a geofence around mobile device 104, which when crossed, will cause activity detection engine 232 to execute the data collection application or return the data collection application to an active state from a suspended state. If mobile device 104 crosses the geofence, then activity detection engine 232 may cause the data collection application to be initiated. For instance, the geofence may surround a user's vehicle or residence such that when the geofence is crossed it is likely due to the user initiating a drive. The geofence may be generated after a period of inactivity such as when the mobile device has been at rest for a predetermined time interval. The geofence may be generated at a predetermined distance from the mobile device such that when the mobile device crosses the geofence it is likely due to the beginning of a drive rather than through other activity such as walking. Activity detection engine 232 may use other mechanisms to determine whether activate the data collection application including, but not limited to, detecting a visit (e.g., that the mobile device is at a particular location), a notification, a time interval, one or more sensor measurements exceeding threshold, or the like.

Since the data collection application of the mobile device 104 cannot collect sensor measurements until it is executed (or returned to an actively executing state), some sensor measurements may missed. For example, the data collection application may miss those sensor measurements associated with the portion of the drive that occurred prior to crossing the geofence. As a result, the data collection application may not collect sensor measurements for the entire drive, thereby missing valuable information about the drive, driver behavior, potential vehicle collisions, etc. In some instances, the mobile device 104 may not detect that a geofence has been crossed at all, thereby never activating the data collection application during the drive. In those instances, the mobile device 104 may miss the drive such that the data collection application does not collect any sensor measurements associated with the missed drive. The data collection application may obtain some sensor measurements collected over the missed drive from other processes executing on mobile device 104.

For instance, an operating system of mobile device 104 may collect and cache some sensor measurements over a sliding window such as an immediately preceding time interval of a predetermined length. The sliding window may include the preceding, twenty-four hours, forty-eight hours, seventy-two hours, ninety-six hours, or any predetermined time interval. Applications of mobile device 104 may request and obtain sensor measurements for up to the length of the sliding window from the operating system.

The operating system may begin collecting and caching sensor measurements upon request by an application such as the data collection application and retain the cached sensor measurements for up to the length of the sliding window. At that point, the operating system discards the oldest sensor measurement each time a new sensor measurement is added. For instance, the operating system may cache up to the previous 72 hours of sensor measurements (e.g., 72 hours from a current time such as now), at which point, the oldest sensor measurements (e.g., anything older than 72 hours) may be discarded such that the cache retains those sensor measurement collected over immediately previous 72 hours. In some instances, the operating system may only allow an application to request collection and caching of sensor measurements for a particular time interval (e.g., that may be smaller than or equal to the length of the sliding window). The data collection application may not be able to request the operating system to cache sensor measurements over the entire sliding window if the particular time interval is less than the sliding window. Instead, the data collection application may generate a series of requests with each subsequent request being sent upon termination of the particular interval of the previous request. This enables the data collection application to request caching of sensor measurements by the operating system for the entire sliding window.

In the following example, the sliding window may be 72 hours in length and the predetermined time interval may be 12 hours. When the data collection application executes (or returns from suspension), the data collection application may generate a first request that the operating system collect and cache sensor measurements for the next 12 hours. In response, the operating system will begin collecting and caching sensor measurements. The data collection application may then perform any intended operations that were the reason for its execution (or return from suspension) or terminate (or return to a suspended state). At the termination of the 12-hour time interval, the data collection application may execute (or return from suspension) and generate a second request to the operating system for collection and caching of sensor data for another 12 hours. In some instances, the data collection application may be executed before the termination of the 12-hour time interval. In that instance, the application may generate the second request to the operating system for collection and caching of sensor data for a 12-hour time interval that begins at the time of the second request (rather than at the termination of the previous 12-hour time interval). The data collection application may also access the sensor measurements from the previous 12-hours (from the first request). This process may be repeated every 12 hours such that the operating system caches up to 72 hours of sensor measurements.

The data collection application may access the cached sensor measurements over the entire 72 hours (e.g., based on each 12-hour request combined) even though the data collection application may be limited to sending requests for data collection and caching over smaller time intervals (e.g., in this case 12 hours). If the data collection application sends a first request (at the zero-hour mark) for 12 hours of sensor measurements, when the data collection application executes (or returns from suspension) 12 hours later, the operating system will have collected and cached 12 hours of sensor measurements that the data collection application may access. When the data collection application sends a second request to the operating system (at the 12-hour mark) for another 12 hours of sensor measurement caching, the operating system continues to collect and cache sensor measurements for the next 12 hours. When the data collection application executes 12 hours later (e.g., now at the 24-hour mark), the data collection application may now access 24 hours of sensor data even though the data collection application may only request that the operating system collect and cache sensor measurements for the next 12 hours.

The data collection application may continue to make requests for collection and caching of sensor measurements even when the cache includes sensor measurements over the 72-hour time interval (e.g., the complete sliding window). Since the cache may only store sensor measurements over the sliding window (e.g., the preceding 72 hours), the oldest sensor measurements (e.g., sensor measurements older than 72 hours) may be discarded as new sensor measurements are stored in the cache. Sensor measurements may be continually discarded as new sensor measurements are continually cached over the next requested time interval (e.g., 12 hours). With back-to-back requests by the data collection application, the data collection application may cause the operating system to perpetually cache the preceding 72 hours of sensor measurements.

Applications of mobile device 104 including components 208-232 may request data collection by the operating system while applications of the mobile device (such as the data collection application) are suspended or not executing. The operating system may collect sensor measurements over a predetermined time interval. For instance, an application may request sensor measurements from the operating system for up to 12 hours after the application is suspended or terminated. When the application is executed again, the application may request access to the sensor measurements collected by the operating system while the application was suspended or terminated.

As previously described, activity detection engine 232 may obtain the sensor measurements that were collected by the operating system (or another application) of the mobile device and generate a probability of an activity associated with the mobile device. Alternatively, this may be performed by the operating system itself. For instance, the operating system may output a probability that mobile device 104 is stationary, walking, running, driving, flying, or the like. Activity detection engine 232 may use the activity data from the operating system to determine a time interval during which a drive was likely to have occurred while the data collection application was suspended or terminated (e.g., not executing). Activity detection engine 232 may then request the sensor data collected by the operating system over the time interval. The sensor data collected by the operating system may be added to any sensor data collected by the data collection application.

For example, activity detection engine 232 may detect that mobile device 104 crossed a geofence and initiate execution of a data collection application to begin collection of sensor measurements such as IMU sensors. The data collection application then requests sensor data from the operating system for a time interval prior to when the mobile device crossed the geofence. This enables the mobile device 104 to capture sensor measurements over the entire duration of the drive despite the application executing and beginning collecting of sensor measurements a few minutes into the drive.

In addition, point-of-impact engine 234 may detect a point-of-impact of a collision on a vehicle, as described below. For instance, the point-of-impact engine 234 can detect if a point-of-impact of a collision is a front-impact collision, rear-impact collision, or side-impact collision. Point-of-impact engine 234 may include a machine-learning model that uses sensor measurements of electronic device 204 or mobile device 104 to generate a prediction of the point-of-impact of a collision on a vehicle. In some instances, point-of-impact engine 234 outputs a probability with the predicted point-of-impact that indicates the probability that the prediction is correct. In those instances, point-of-impact engine 234 may output more than one probability such as a 70% probability that the collision was a front-impact collision, and a 20% probability that the collision was a side-impact collision, and 10% probability that the collision was a rear-impact collision. The probability may be expressed as a integer or real number, a percentage, a grade (such as a low, medium, or high), or in another mechanism configured to represent the probability of a predicted point-of-impact.

In another example, when the data collection application is executed, the data collection application requests sensor data from the operating system of mobile device 104 over a time interval prior to execution of the data collection application. The data collection application identifies from the activity data a first-time interval during which the operating system determines with a high probability that a drive occurred. The data collection application then requests the sensor data collected by the operating of the mobile device 104 over the first-time interval. In some instances, there may be a delay between when the drive begins and the operating system detects that a drive activity is occurring. Similarly, there may be delay between when the drive ends and the operating system detects that the drive ended. To ensure that sensor data for the entire trip is collected, the data collection application may request the sensor data over a second (larger) time interval that begins prior to the first-time interval (e.g., one minute, five minutes, ten minutes, or the like before the first time interval begins) and ends after the first-time interval (e.g., one minute, five minutes, ten minutes, or the like after the first-time interval ends).

Vehicle Crash Event Prediction Based on Single Vehicle Data

Figure 3:
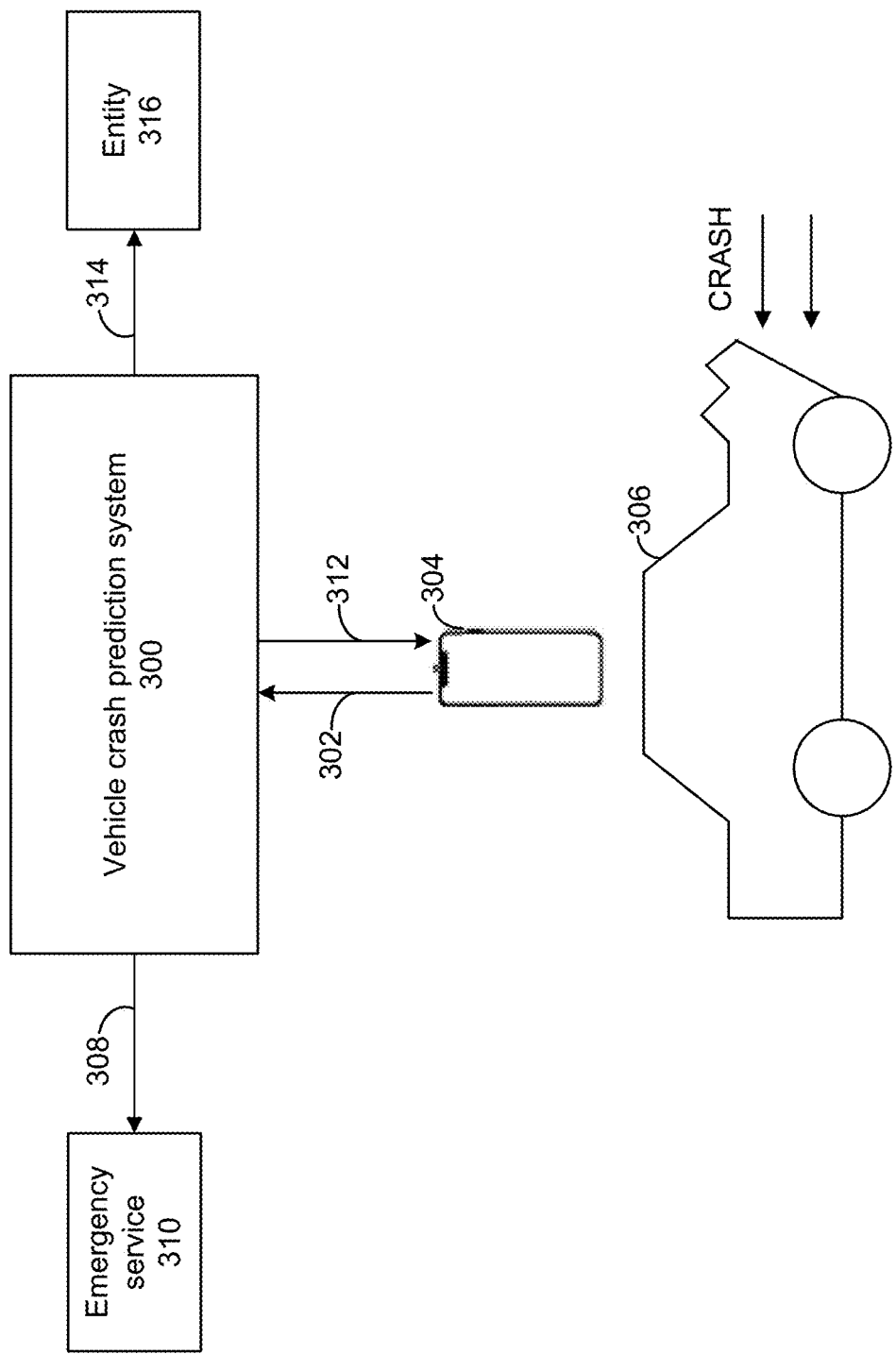
FIG. 3 illustrates an example of a vehicle crash prediction system according to some aspects of the present disclosure.

FIG. 3 illustrates an example of a vehicle crash prediction system 300 according to some aspects of the present disclosure. Vehicle crash prediction system 300 can be supported by the systems described in relation to FIG. 1 and FIG. 2 above. As shown in FIG. 3, a vehicle crash prediction system 300 can receive data 302 from a mobile device 304, which can be part of mobile device 104 of FIG. 1 and FIG. 2. Data 302 can include various data collected by sensor data block 108 for a vehicle 306, such as location and speed data (e.g., from GPS receiver 112), acceleration data (e.g., from accelerometer 116), orientation data (e.g., from magnetometer 120 and gyroscope 124), direction of travel data (e.g., from compass 136), etc. Mobile device 304 can be operated by a driver of vehicle 306. Vehicle crash prediction system 300 can process at least some of data 302, together with other data, such as contextual data about an operation of mobile device 304, to predict/detect whether a vehicle crash event involving vehicle 306 has occurred. The vehicle crash event may be between vehicle 306 and other vehicles (not shown in FIG. 3), or between vehicle 306 and other non-vehicles (e.g., a pedestrian, a standing structure, a tree, etc.). In some examples, vehicle crash prediction system 300 can be part of mobile device 304, whereas in some examples, at least some of the functions of vehicle crash prediction system 300 can be performed by electronic device 204 of FIG. 2 and/or one or more servers in a cloud infrastructure.

Vehicle crash prediction system 300 can perform one or more actions based on determining that a vehicle crash event involving vehicle 306 has occurred. For example, as shown in FIG. 3, vehicle crash prediction system 300 can automatically transmit a notification 308 (e.g., a push notification, an email, a robocall, a text message, or the like) to an emergency service 310 to report the vehicle crash event, without requiring the driver to contact emergency service 310 and thereby speed up a rescue operation. As another example, vehicle crash prediction system 300 can transmit a notification 312 back to mobile device 304 to, for example, ask the driver to confirm that the vehicle crash event has just occurred, and to ask for additional information about the vehicle crash event. In addition, vehicle crash prediction system 300 can transmit a notification 314 to an entity 316, which can be an insurance provider of vehicle 306, an insurance provider of another vehicle involved in the crash event, an investigator, etc., to notify entity 316 about the crash event. Vehicle crash prediction system 300 can also provide additional data, such as motion data (e.g., orientation, speed, acceleration, direction of travel, etc.), location data, etc., of vehicle 306 and/or other vehicles potentially involved in the crash to entity 316 to aid an investigation operation to, for example, determine/confirm a severity of the crash event, determine/confirm the damage/injury caused by the crash event, determine the liability of each driver involved in the crash event, etc.

Figure 4:
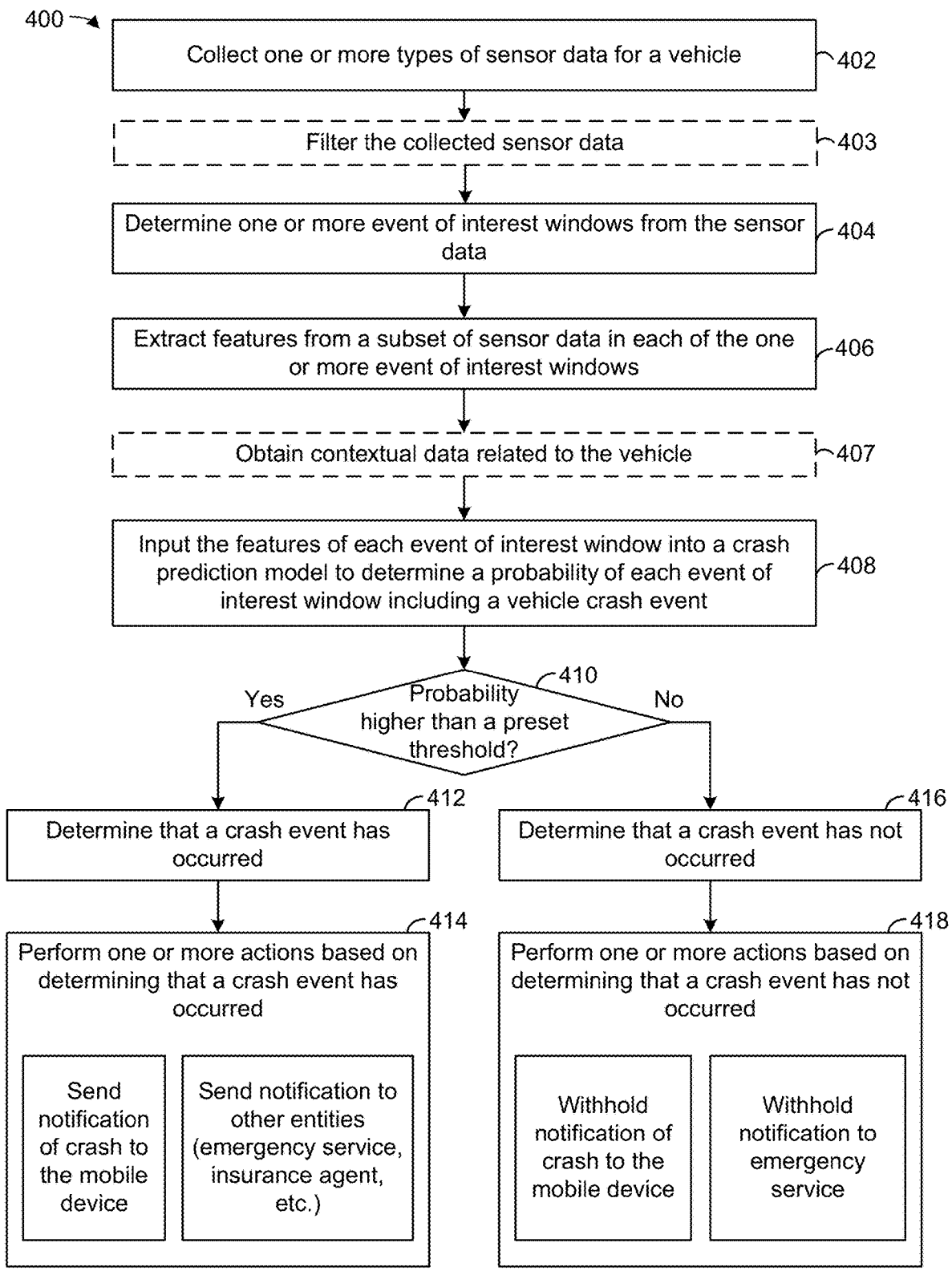
FIG. 4 illustrates a flowchart of an exemplary process for predicting whether a vehicle crash event has occurred according to some aspects of the present disclosure.

FIG. 4 illustrates a flowchart of an exemplary process 400 for predicting whether a vehicle crash event has occurred. In some embodiments, the vehicle crash prediction is performed by a vehicle crash prediction system, such as vehicle crash prediction system 300 as described above. Some or all of the blocks of process 400 can be performed by a mobile device (e.g., mobile device 104, mobile device 304, etc.), by a server in a cloud infrastructure (e.g., electronic device 204), or by a combination of both.

At block 402, process 400 involves collecting one or more types of sensor data for a vehicle. In some embodiments, a mobile device (e.g., mobile device 104, mobile device 304, etc.) collects one or more types of sensor data for a vehicle, such as location and speed data (e.g., from GPS receiver 112), acceleration data (e.g., from accelerometer 116), orientation data (e.g., from magnetometer 120 and gyroscope 124), direction of travel data (e.g., from compass 136), audio data (e.g., from microphone 128), etc. The sensor data may be collected in response to receiving a notification by the mobile device. For example, after determining that the mobile device has crossed a geofence, a notification may be issued to the mobile device to begin collecting sensor data for the vehicle. Alternatively, or additionally, the mobile device may collect and store sensor data over repeating periods of time for future analysis and processing.

Figure 5A:
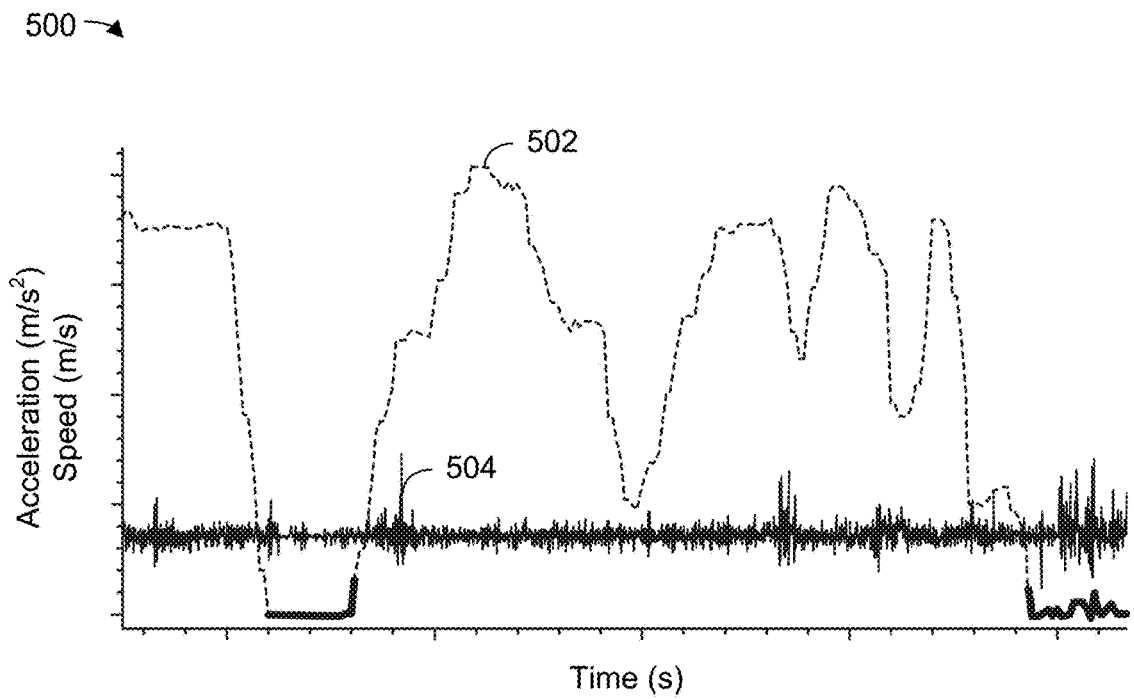
FIG. 5A illustrates a graph data structure of sample sensor data collected over time according to some aspects of the present disclosure.

FIG. 5A illustrates a graph data structure 500 of sample sensor data collected over time according to some aspects of the present disclosure. The ordinate of graph data structure 500 represents the speed, measured in meters per second, and acceleration, measured in meters per second squared, of the vehicle. The abscissa of graph data structure 500 represents the time at which the sensor data was collected. Graph data structure 500 illustrate examples of speed data 502 and acceleration data 504 with respect to time collected by the mobile device. Speed data 502 can be based on GPS signals from a GPS receiver, such as GPS receiver 112. Acceleration data 504 can be based on output signals from an accelerometer, such as accelerometer 116. Although speed data 502 and acceleration data 504 are shown in graph data structure 500, it is understood that other types of time-series data, such as audio data, pressure data, etc., can also be analyzed using the techniques described below to perform a vehicle crash prediction operation.

Referring back to FIG. 4, at block 403, process 400 involves optionally filtering the collected sensor data. In some examples, a vehicle crash prediction system, such as vehicle crash prediction system 300, can filter the sensor data after it is collected and before proceeding to block 404. Filtering the collected sensor data can include passing the sensor data through a bandpass filtering operation as described above in FIG. 1 and FIG. 2 to remove high frequency components (e.g., noise) from the sensor data, to reduce the likelihood of mistaking the high frequency noise as sharp decelerations and/or changes in travel direction of a vehicle.

At block 404, process 400 involves determining one or more event of interest windows from the sensor data. The one or more event of interest windows may be determined by a vehicle crash prediction system, such as vehicle crash prediction system 300 as described above. The event of interest windows refer to sections of time (i.e., time windows) within which the sensor data collected in block 402 may represent an event of interest, such as a crash event. In a case where a crash event is to be detected, sensor data that shows sharp deceleration of the vehicle (based on sharp negative changes in the speed data to zero, large negative acceleration, etc.), sensor data that shows sharp changes in the direction of travel of the vehicle (e.g., a sharp change from a longitudinal movement to a lateral movement), sensor data that shows certain portions of the vehicle receiving a large impact force, etc., may reveal the occurrence of a crash event. After identifying the event of interest windows, subsets of sensor data in those time windows can then be further analyzed to predict whether a crash event has indeed occurred.

Figure 5B:
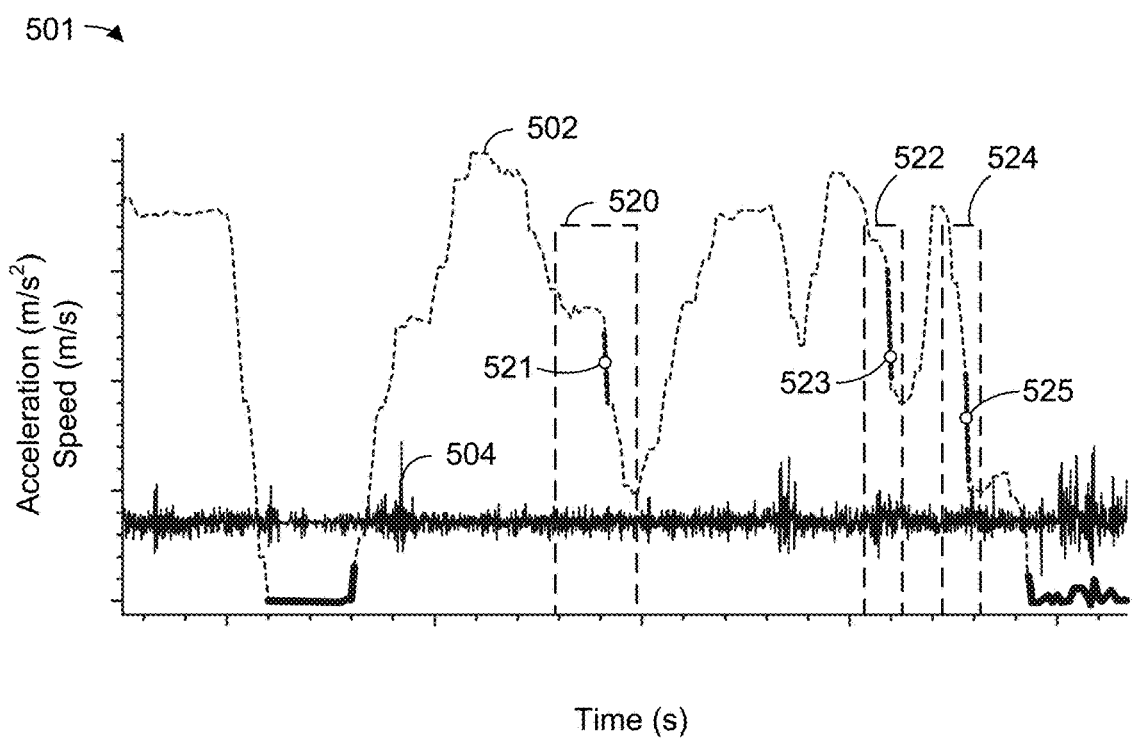
FIG. 5B illustrates a graph data structure of sample sensor data collected over time with identified events of interest and their associated event of interest windows according to some aspects of the present disclosure.

FIG. 5B illustrates the graph data structure 501 of sample sensor data collected over time with identified events of interest and their associated event of interest windows according to some aspects of the present disclosure. Using the speed data 502 and the acceleration data 504, a vehicle crash prediction system, such as vehicle crash prediction system 300, can determine time windows, such as event of interest windows 520, 522, and 524 each having, respectively, an event of interest 521, 523, and 525. Event of interest 521, 523, and 525 may each be identified as a potential crash event due to the sensor data exhibiting characteristics indicative of a crash event. For example, during each event of interest window 520, 522, and 524, the speed data 502 indicates a sudden and/or sharp deceleration.

Figure 5C:
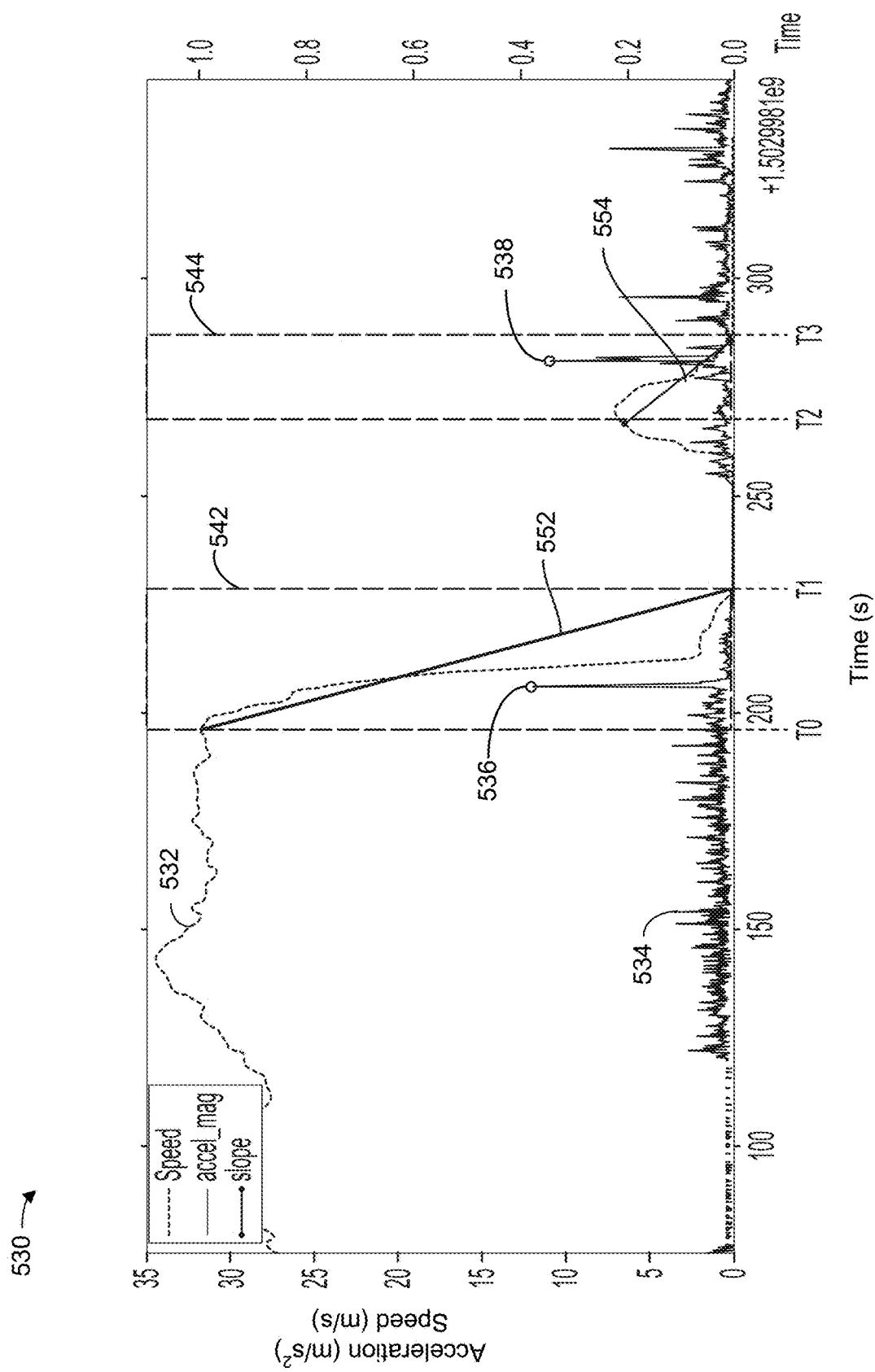
FIG. 5C illustrates another graph data structure of sample sensor data collected over time with determined event of interest windows according to some aspects of the present disclosure.

FIG. 5C illustrates another graph data structure 530 of sample sensor data collected over time with determined event of interest windows according to some aspects of the present disclosure. The ordinate of graph data structure 530 represents the speed, measured in meters per second, and acceleration, measured in meters per second squared, of a vehicle. The abscissa of graph data structure 530 represents the time at which the sensor data was collected. Graph data structure 530 illustrates examples of speed data 532 and acceleration data 534 with respect to time collected by the mobile device. Using the speed data 532 and acceleration data 534, a vehicle crash prediction system, such as vehicle crash prediction system 300, can identify event of interest 536 and event of interest 538 based on, for example, acceleration data 534 at those points in time exceeding a threshold. The vehicle crash prediction system can then determine a time window 542 around event of interest 536 and a time window 544 around event of interest 538. The determination of a time window can be based on fitting a linear graph over speed data 532 from when the speed of the vehicle starts dropping, which corresponds to the start of the deceleration, to when the speed of the vehicle drops to zero, which corresponds to the end of the deceleration. The section of time spanned by the linear graph can correspond to a time window (e.g., an event of interest window). For example, time window 542 can be determined by the section of time spanned by a linear graph 552 fitted over a first subset of speed data 532 between times T0 and T1, whereas time window 544 can be determined by the section of time spanned by a linear graph 554 fitted over a second subset of speed data 532 between times T2 and T3.

Referring back to FIG. 4, at block 406, process 400 involves extracting features from a subset of the sensor data in each of the one or more event of interest windows. The features may be extracted by a vehicle crash prediction system, such as vehicle crash prediction system 300 described above. Specifically, vehicle crash prediction system 300 can extract subsets of the sensor data included in the sections of time defined by the event of interest windows determined in block 404, and generate features that can be used for crash event prediction based on the subsets of the sensor data. The extracted features may include information relating to the slope of the speed data during the event of interest window, the length or duration of the event of interest window, GPS and/or accelerometer statistics based on the event time, lateral and/or longitudinal acceleration data during the event of interest window and/or at the time of the event of interest, pressure data (e.g., as a result of airbag activation or impact pressure), or any similarly suitable information indicative of a crash event.

Specifically, the slope of speed data, as well as event of interest window length, can provide an indication of whether sharp changes in the speed of a vehicle have taken place, which can indicate a crash event. A relatively long event of interest window, together with the speed data having a relatively small slope, may indicate that the vehicle is merely braking to stop rather than being stopped by a crash. In addition, the GPS/accelerometer statistics can indicate a state of motion of the vehicle before and after the suspected crash event. For example, if the GPS/accelerometer statistics indicate that the vehicle restarts a movement and then moves over a relatively long distance, it may indicate that either no crash or a very light crash has occurred, such that the vehicle has the capability to travel over a long distance after the event. In addition, lateral acceleration, as well as pressure data, may indicate the type of collision (e.g., side-collision, head-on collision, etc.) that has occurred. For example, if the sensor data indicates that the vehicle experiences a sharp lateral acceleration after an event, or the airbags on the side of the vehicle have been deployed, and/or that the side of the vehicle senses an impact force, this may indicate that the vehicle experiences a side collision rather than a head on collision. On the other hand, if there is no or very little lateral/longitudinal accelerations, and there is no airbag deployment, it may indicate that no crash event has occurred. Each feature can be further encoded into a feature vector for processing by a vehicle crash prediction system, such as vehicle crash prediction system 300.

At block 407, process 400 involves optionally obtaining contextual data related to the vehicle. The contextual data may be obtained in addition to the features extracted at block 406. A vehicle crash prediction system, such as vehicle crash prediction system 300 can obtain the contextual data related to the vehicle or the mobile device. The contextual data can be combined with the features extracted at block 406 to improve the accuracy of crash event predictions. The contextual data may include information relating to the road type on which the vehicle is driving on, whether the vehicle is at an intersection, a parking lot, or a principle location of the vehicle (e.g., a home), a detected activity of the user of the mobile device (e.g., walking, driving, stationary), whether the user is, or was, making a phone call, a destination of the vehicle, spectral information from IMU, or any similarly suitable information related to the context in which an event of interest may have occurred. Some of the contextual data can be generated locally by a vehicle crash prediction system, such as vehicle crash prediction system 300, by an activity detection engine, such as activity detection engine 232 as described above.

The contextual data can provide a contextual interpretation of the sensor data to reduce the likelihood of misidentifying (or missing) a crash event. For example, based on contextual data indicating that a vehicle is being driven on a rugged road, vehicle crash prediction system 300 may set a higher threshold for speed data change and/or accelerometer data for predicting a crash event. Moreover, based on contextual data showing that the vehicle is in an intersection or in a parking lot, at a principal location where there is stop-and-go traffic, and/or has reached the destination, vehicle crash prediction system 300 may determine that the vehicle is likely to have frequent and sharp decelerations to avoid hitting other vehicles/pedestrians. Vehicle crash prediction system 300 may also set a higher threshold for speed data change and/or accelerometer data for predicting a crash event as a result. Vehicle crash prediction system 300 may also detect a pattern of sharp decelerations and determine that such a pattern is consistent with driving in stop-and-go traffic and does not indicate a crash event. Moreover, certain detected activities (e.g., walking), as well as spectral information from the IMU, can infer that the vehicle is not moving, and all the detected motion of the mobile device is attributed to the mobile device itself (or the user who carries the mobile device), and therefore vehicle crash prediction system 300 will not perform a crash event prediction operation. Moreover, contextual data indicating that the user has made a phone call after the event, such as to a tow truck company, to an emergency service (e.g., emergency agency), etc., may indicate that the event is a crash event. Each type of contextual data can be encoded into a vector for processing by a vehicle crash prediction system, such as vehicle crash prediction system 300.

At block 408, process 400 involves inputting the features of each event of interest window into a crash prediction model to determine a probability of each event of interest window including a vehicle crash. In some embodiments, the features may be input into a model by a vehicle crash prediction system, such as vehicle crash prediction system 300 as described above. In some instances, the contextual data obtained at block 407 can be combined with the extracted features to improve the accuracy of the crash event prediction. Using the extracted features, and optionally the contextual data, a crash prediction model can output a probability that each event of interest is a vehicle crash event. For example, referring back to FIG. 5B, a crash prediction model may generate a probability of each event of interest 521, 523, and 525 being a vehicle crash event.

The crash prediction model can be implemented using various techniques, such as a rule-based prediction model, a machine-learning classifier, etc. A rule-based prediction model can apply pre-determined rules on the features and the contextual data to compute probabilities. In addition, a machine-learning classifier can be trained based on prior data collected from actual crash events, such as sensor data and prior contextual data of known crash events, to perform a prediction based on new sensor data and new contextual data. The machine-learning classifier can be implemented in various forms, such as a decision tree, a neural network model, etc.

Figure 6A:
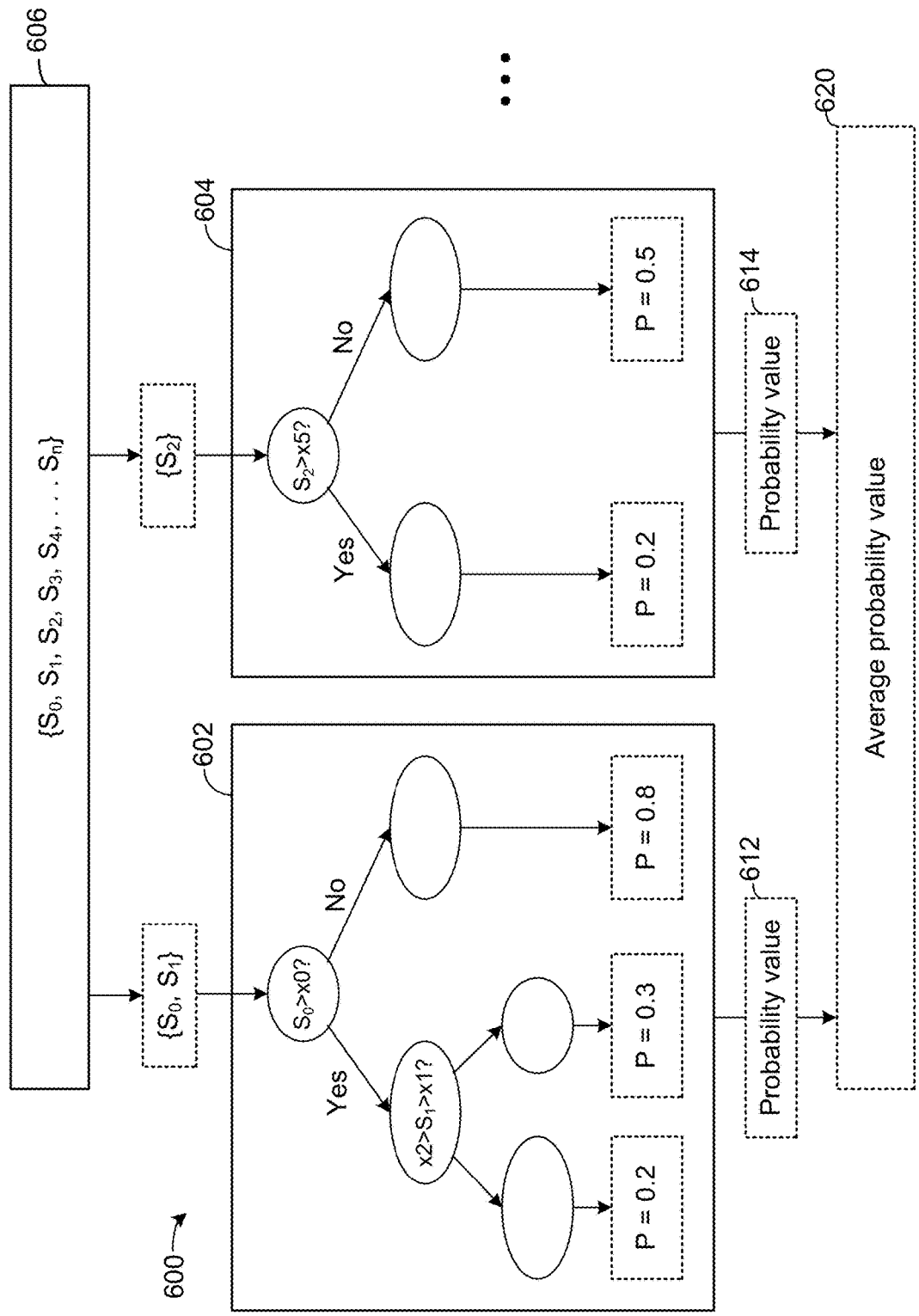
FIG. 6A illustrates an example of a crash prediction model using decision trees according to some aspects of the present disclosure.

FIG. 6A illustrates an example of a crash prediction model 600 using decision trees. As shown in FIG. 6A, prediction model 600 can include multiple decision trees such as decision trees 602 and 604. In some embodiments, the decision trees are implemented using XGBoost. Each decision tree can be assigned to process feature data and/or contextual data of one or more categories included in an event of interest window as part of input data 606. For example, decision tree 602 can be assigned to process feature data of feature categories S0 and S1, whereas decision tree 604 can be assigned to process feature data of feature category S2. Each decision tree can compare the feature data against one or more thresholds (e.g., x0, x1, x5, etc.) to output a probability. For example, decision tree 602 can output a probability value 612, whereas decision tree 604 can output a probability value 614. The probability values can be summed and averaged to output a probability 620 of an event of interest window containing a vehicle crash event. The assignment of the different feature data categories to the decision trees, the thresholds, as well as the output probability of each decision tree can be generated using a gradient boosting training operation.

Figure 6B:
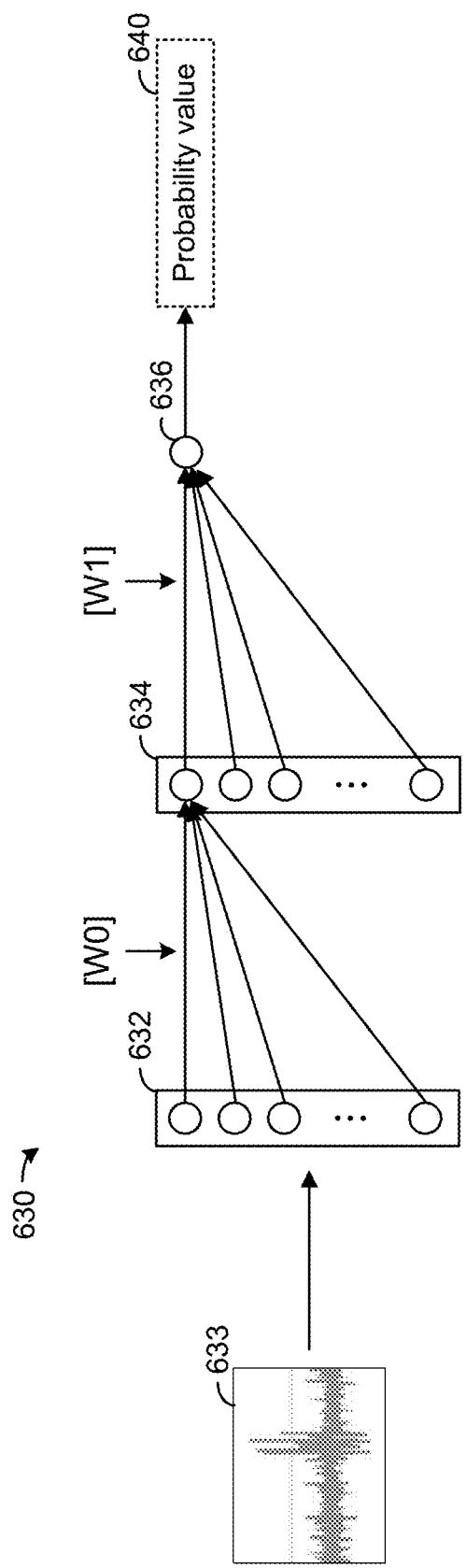
FIG. 6B illustrates an example of a crash prediction model using multi-layer neural networks according to some aspects of the present disclosure.

FIG. 6B illustrates an example of a crash prediction model 630 using multi-layer neural networks. As shown in FIG. 6B, prediction model 630 can include a multi-layer neural network including an input layer 632, an intermediate layer 634, and an output layer 636. Input layer 632 can receive a set of feature data of the same feature category, such as accelerometer data, speed data, etc., as part of input data 633. Each node of input layer 632 can be assigned to process a subset of the feature data (e.g., feature data at a particular time point) by scaling the data with a weight from weight matrix [W0]. Each node of input layer 632 can transmit the scaled input data to a node in intermediate layer 634, which can sum the scaled input data and generate an intermediate output. Intermediate layer 634 can also perform additional processing, such as applying an activation function to the sum of the scaled input data to generate the intermediate output. Each node in intermediate layer 634 may further scale the sum with another weight from weight matrix [W1]. Output layer 636 can receive the scaled intermediate output from each node of intermediate layer 634 and generate a sum, which can become probability value 640. The weights [W0] and [W1] can be generated from a gradient decent training operation.

Referring back to FIG. 4, at block 410, process 400 involves determining whether the probability of a crash event is higher than a preset threshold. The determination may be made using a vehicle crash prediction system, such as vehicle crash prediction system 300. At block 412, if the probability is higher than the threshold, process 400 involves determining that crash event has occurred in one of the event of interest windows. At block 414, process 400 involves performing one or more actions based on determining that a crash event has occurred. The one or more actions may be performed by a vehicle crash prediction system, such as vehicle crash prediction system 300. The one or more actions may include, for example, sending a notification of the crash to the mobile device to confirm that the crash event has occurred and/or to ask for additional information about the crash event. As another example, a notification may be sent to other entities such as, for example, emergency services, insurance agents, and/or potential witnesses. In some examples, vehicle crash prediction system 300 may send the notification to insurance agents based on a lower probability threshold than a probability threshold for sending the notification to the mobile device or emergency services, to provide the insurance agents with notifications about suspected crash events. Using a lower threshold to notify insurance agents of suspected crash events may allow the agents to investigate the suspected events further, for example to verify a minor accident and/or adjust insurance rates based on risky driving behaviors.

At block 416, if the probability is below the preset threshold, process 400 involves determining that a crash event has not occurred. At block 418, process 400 involves performing one or more actions based on determining that a crash event has not occurred. The one or more actions may include, for example, withholding notification of a crash to the mobile device and/or withholding notification to emergency services or potential witnesses.

It should be appreciated that the specific steps illustrated in FIG. 4 provide a particular method for predicting whether a vehicle crash event has occurred. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

Vehicle Crash Event Prediction Based on Multiple Vehicle Data

Although vehicle crash prediction system 300 can perform a prediction of a vehicle crash event with reasonable accuracy, it may be difficult to independently verify the prediction before taking an action. This is especially true when making a decision about whether to report to emergency services within a short period of time after the suspected crash event.

To address such issues, a crash event prediction can be made based on sensor data associated with multiple events collected using multiple mobile devices in multiple vehicles. Specifically, a degree of alignment can be determined for various characteristics between two events collected by two separate mobile devices within two separate vehicles. If the degree of alignment exceeds a threshold, a prediction can be made that the multiple events correspond to the same, single crash event involving the multiple vehicles. Such arrangements allow independent verification of one predicted crash event against another. Moreover, given that it utilizes, for example, a certain degree of space and/or time alignment between the multiple crash events for them to be considered as the same crash event, the likelihood of falsely predicting multiple crash events as the same crash event is low, since two falsely predicted crash events are unlikely to substantially align in time and/or space. Thus, embodiments of the present invention improve the accuracy of the vehicle crash prediction in order to ensure that subsequent actions taken based on the prediction are appropriate and warranted.

Example techniques to perform a crash event prediction based on sensor data associated with two events collected using two mobile devices in two different vehicles are presented below. It is understood that the example techniques can be extended to performing a crash event prediction based on sensor data from three or more events collected using three or more mobile devices. Some of the mobile devices can be associated with different vehicles, or with the same vehicle.

Figure 7A:
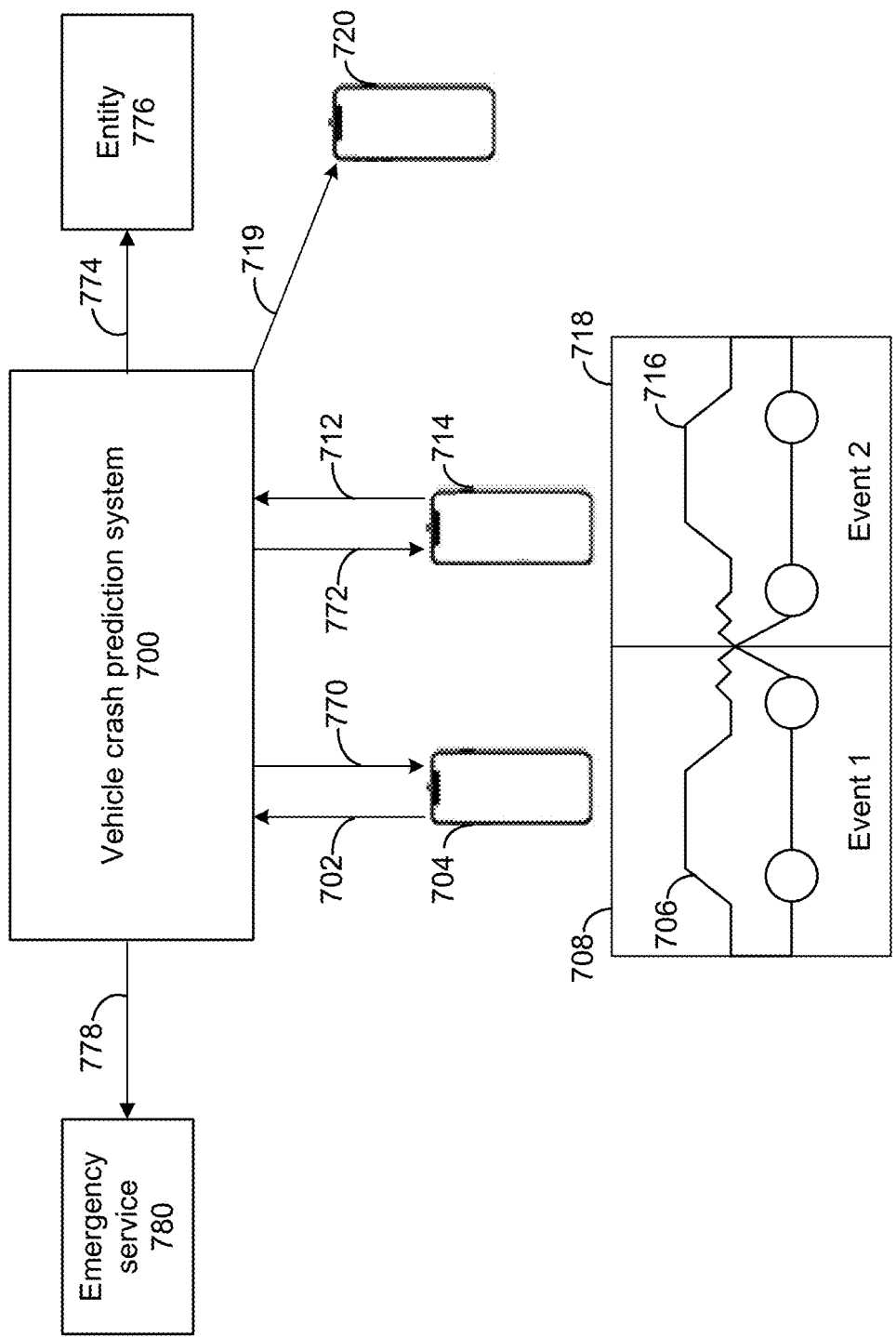
FIG. 7A illustrates an example of a vehicle crash prediction system used to perform a vehicle crash prediction based on data from multiple mobile devices according to some aspects of the present disclosure.

FIG. 7A illustrates an example of a vehicle crash prediction system 700 used to perform a vehicle crash prediction based on data from multiple mobile devices according to an embodiment of the present invention. Vehicle crash prediction system 700 can be performed by mobile device 104 of FIG. 1 and FIG. 2, and/or one or more servers in a cloud infrastructure. As shown in FIG. 7A, vehicle crash prediction system 700 can receive data 702 from a mobile device 704, such as mobile device 104 as described above in relation to FIG. 1 and FIG. 2. Mobile device 704 can be operated by a driver of a vehicle 706. In some examples, mobile device 704 can also be associated with a first entity (e.g., a first insurance carrier that insures vehicle 706).

In addition, vehicle crash prediction system 700 can also receive data 712 from a mobile device 714, which can also be a mobile device such as mobile device 104 of FIG. 1 or FIG. 2. Mobile device 714 can be operated by a driver of vehicle 716. In some examples, mobile device 714 can also be associated with a second entity (e.g., a second insurance carrier that insures vehicle 716). The first and second entities can be the same entity or different entities. Both data 702 and data 712 can include various data collected by a sensor data block, such as sensor data block 108, for vehicle 706 and vehicle 716, such as location and speed data (e.g., from GPS receiver 112), acceleration data (e.g., from accelerometer 116), orientation data (e.g., from magnetometer 120 and gyroscope 124), direction of travel data (e.g., from compass 136), etc.

In some examples, data 702 can include an indication of a first suspected crash event 708 (e.g., "Event 1") involving vehicle 706, whereas data 712 can include an indication of a second suspected crash event 718 (e.g., "Event 2") involving vehicle 716. Utilizing embodiments of the present invention, first suspected crash event 708 and second suspected crash event 718 can be analyzed and it can be determined that although these events appeared to be separate events, they are, in fact, a single event involving both vehicle 706 and vehicle 716.

The data may include, for example, the times and the locations of the suspected crash events, probabilities that the suspected crash events are actual crash events, as well as additional information related to the suspected crash events. For example, data 702 and data 712 may indicate a point-of-impact of, respectively, vehicle 706 and vehicle 716 (e.g., whether the point-of-impact is at the front, on the side, at the rear, etc.), degrees of severity of the impacts for both vehicles, states of motion of both vehicles (e.g., speed, direction of travel, etc.) prior to the suspected crash events, etc. Some or all of data 702 and data 712, including the probability of a vehicle crash event, can be generated by vehicle crash prediction system 700 on mobile device 704 and mobile device 714 based on, respectively, sensor data collected for vehicle 706 and vehicle 716.

Vehicle crash prediction system 700 can determine, based on data 702 and data 712, a degree of alignment of various characteristics between first suspected crash event 708 and second suspected crash event 718, and determine whether first suspected crash event 708 and second suspected crash event 718 corresponds to the same, single crash event involving vehicle 706 and vehicle 716.

Figure 7B:
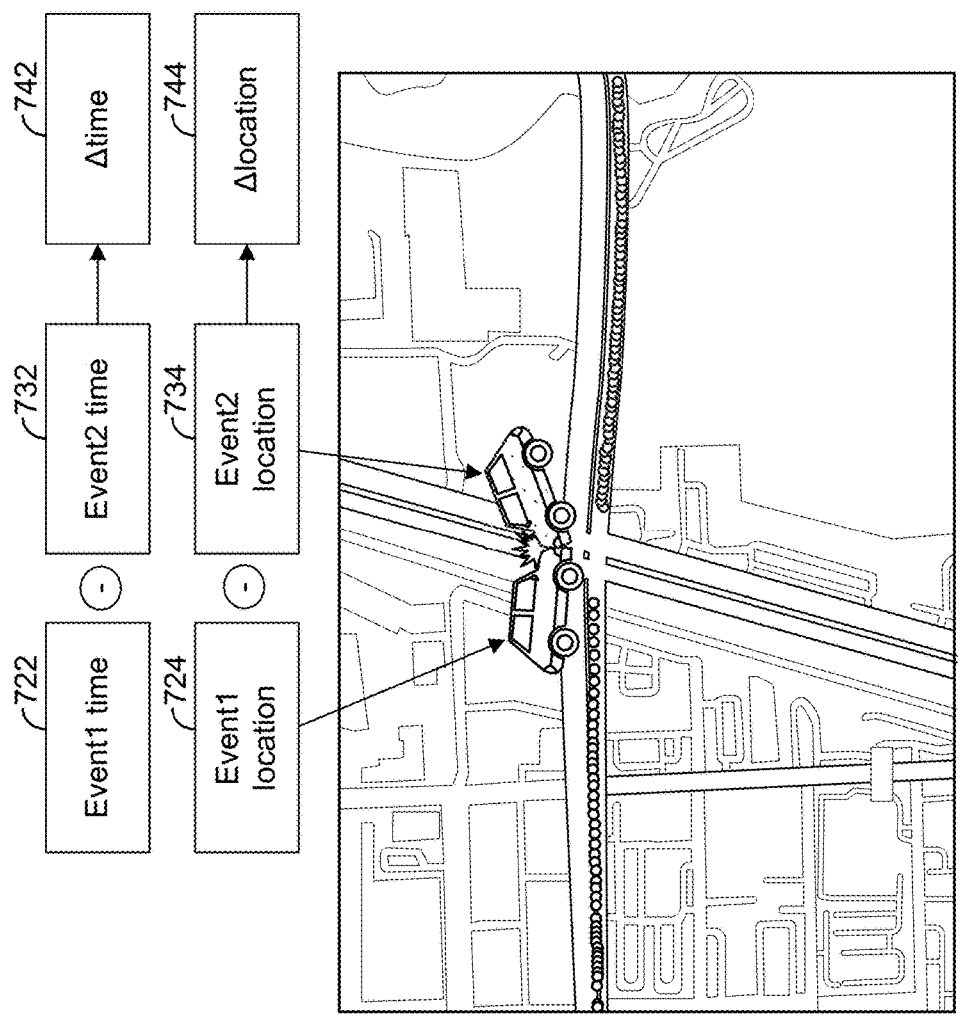
FIG. 7B illustrates an example of a degree of alignment determination operation performed by a vehicle crash prediction system according to some aspects of the present disclosure.

FIG. 7B illustrates an example of a degree of alignment determination operation performed by vehicle crash prediction system 700 according to some aspects of the present disclosure. As illustrated in FIG. 7B, vehicle crash prediction system 700 can determine, from data 702, a first time stamp 722 and a first location 724 of the first suspected crash event 708 (e.g., Event 1) of vehicle 706. Vehicle crash prediction system 700 can also determine, from data 712, a second time stamp 732 and a second location 734 of the second suspected crash event 718 (e.g., Event 2) of vehicle 716. Vehicle crash prediction system 700 can then compute a time difference 742 and a location difference 744 (e.g., a distance and altitude difference) between first suspected crash event 708 and second suspected crash event 718. The time difference and location difference can reflect a degree of alignment between first suspected crash event 708 and second suspected crash event 718. For example, a minimal (e.g., close to zero) time difference 742 and location difference 744 can indicate a high degree of alignment between first suspected crash event 708 and second suspected crash event 718 The high degree of alignment may in turn indicate that first suspected crash event 708 and second suspected crash event 718 are likely to correspond to the same crash event. In one example, if time difference 742 is lower than a threshold of 10 seconds, and location difference 744 is below a threshold of 200 meters, it can be determined that first suspected crash event 708 and second suspected crash event 718 are likely to correspond to the same crash event.

On the other hand, if the location difference exceeds a certain distance threshold, which may indicate that the two events are far away from each other, or if the time difference exceeds a certain time threshold, which may indicate that the two events occur at different times, it may be determined that first suspected crash event 708 and second suspected crash event 718 are likely to correspond to different events. If vehicle crash prediction system 700 cannot find other events that align with first suspected crash event 708 and second suspected crash event 718, and given that first suspected crash event 708 cannot be used to confirm second suspected crash event 718 and vice versa, vehicle crash prediction system 700 may determine that neither first suspected crash event 708 nor second suspected crash event 718 corresponds to a vehicle crash event.

Figure 7C:
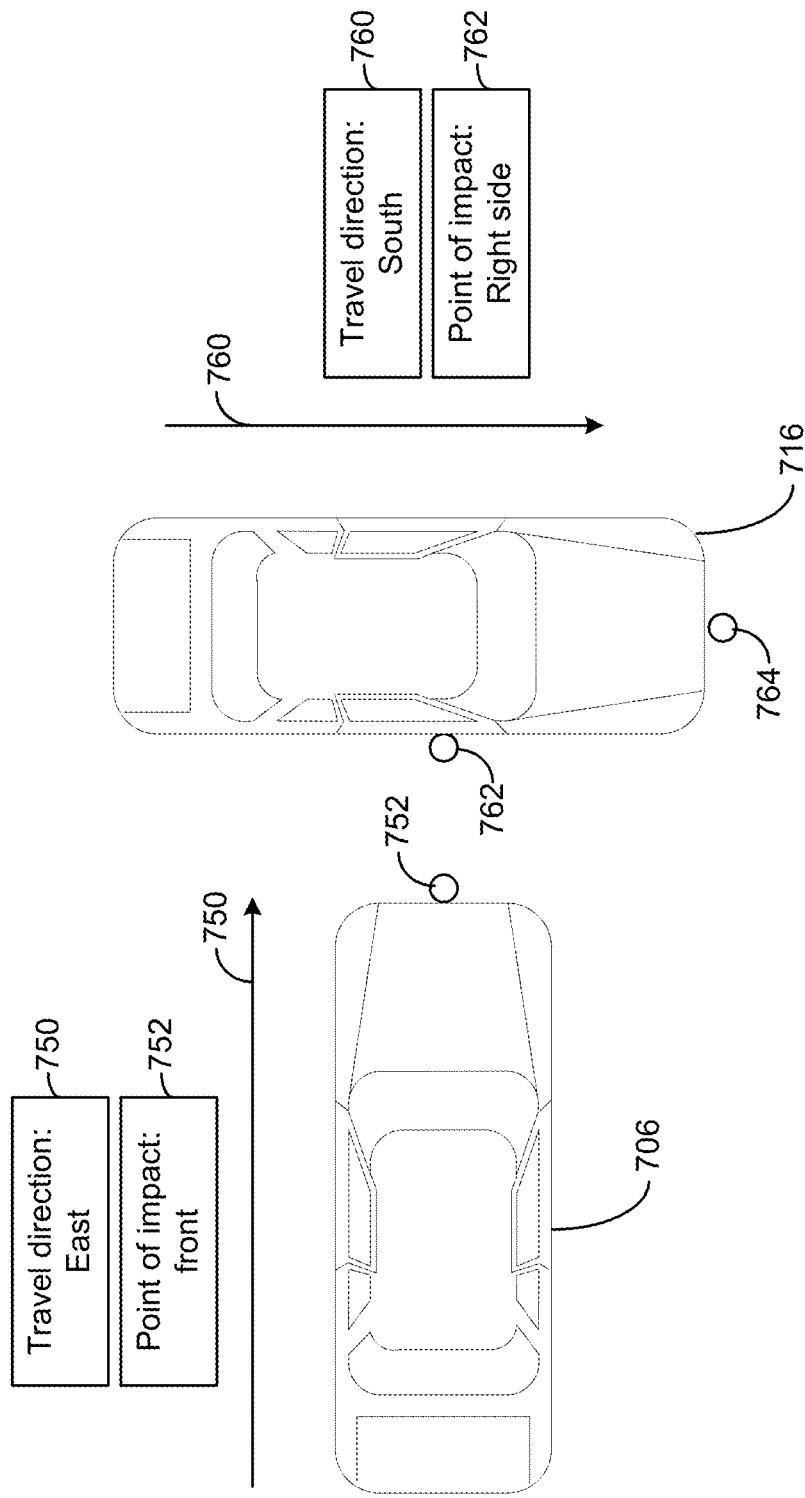
FIG. 7C illustrates another example of a degree of alignment determination operation performed by a vehicle crash prediction system according to some aspects of the present disclosure.

FIG. 7C illustrates another example of a degree of alignment determination operation performed by vehicle crash prediction system 700 according to some aspects of the present disclosure. As shown in FIG. 7C, based on speed and/or location data (e.g., from GPS) included in data 702, vehicle crash prediction system 700 can determine that a travel direction 750 of vehicle 706 is East during first suspected crash event 708. Moreover, based on accelerometer data and/or pressure data of data 702, vehicle crash prediction system 700 can determine a point-of-impact 752 at the front of vehicle 706 during first suspected crash event 708.

Moreover, based on speed data, location data, accelerometer data, and/or pressure data included in data 712, vehicle crash prediction system 700 can also determine that a travel direction 760 of vehicle 716 is South during second suspected crash event 718, and a point-of-impact 762 at the right side of vehicle 716 during second suspected crash event 718. Assuming that the time and location of first suspected crash event 708 and second suspected crash event 718 also align, vehicle crash prediction system 700 may determine that travel direction 750 and point-of-impact 752 of vehicle 706, as well as travel direction 760 and point-of-impact 762 of vehicle 716, are consistent with a single crash event in which a front side of vehicle 706 crashed into the right side of vehicle 716. As a result, vehicle crash prediction system 700 may determine that first suspected crash event 708 and second suspected crash event 718 correspond to the same crash event. On the other hand, if second suspected crash event 718 indicates a point-of-impact 764 at the front of vehicle 716, vehicle crash prediction system 700 may determine that there is inconsistency among the points of impacts and relative directions of travel of the vehicles, and may determine that first suspected crash event 708 and second suspected crash event 718 do not correspond to the same crash event.

The degree of alignment of other types of data can also be determined. For example, the mobile devices in each of vehicle 706 and vehicle 716 can include a microphone to collect audio data. A loud, short duration sound having an amplitude above a threshold can indicate a crash event. By determining whether the microphones in each of vehicle 706 and vehicle 716 detect a loud, short duration sound that exceeds the threshold for each of first suspected crash event 708 and second suspected crash event 718, and the timing difference of detection of such a sound in each microphone, vehicle crash prediction system 700 can also determine whether first suspected crash event 708 and second suspected crash event 718 correspond to the same crash event. Thus, although time differences, location differences, sounds, and the like are discussed herein, embodiments of the present invention are not limited to these exemplary types of data and the degree of alignment of other types of data are included within the scope of the embodiments described herein. One of ordinary skill in the art would recognize many variations, modifications, and alternatives.

In some examples, vehicle crash prediction system 700 may include one or more machine learning models, such as prediction model 600 and/or prediction model 630 described in relation to FIG. 6A and FIG. 6B, that can obtain various features representing a degree of alignment between two events, and determine a probability that the two events correspond to the same crash event based on the features. The features can include, for example, a location difference/relative location (e.g., distance, altitude difference, etc.) between two events, a time difference between two events, point-of-impacts of two vehicles at the two events, severity of impacts at the two events, direction/speed of travels of the two vehicles at the two events, etc. Vehicle crash prediction system 700 can input the features to the prediction model, such as a machine learning model, to output the probability. If the probability exceeds a threshold, vehicle crash prediction system 700 can determine that the two events correspond to a single crash event involving the two vehicles.

Referring back to FIG. 7A, vehicle crash prediction system 700 can perform one or more actions based on determining that first suspected crash event 708 and second suspected crash event 718 correspond to the same crash event. For example, vehicle crash prediction system 700 can automatically transmit notification 778 (e.g., a push notification, an email, a robocall, a text message, or the like) to an emergency service 780 to report the vehicle crash event, without requiring the drivers of vehicle 706 and vehicle 716 to contact emergency service 780, as similarly described in relation to FIG. 3. As another example, vehicle crash prediction system 700 can transmit notification 770 and notification 772 back to mobile device 704 and mobile device 714 respectively to confirm the vehicle crash and to ask for additional information about the predicted vehicle crash event. In addition, vehicle crash prediction system 700 can also transmit a notification 774 to entity 776, which can be an insurance provider of vehicle 706 and/or vehicle 716, an investigator, etc., to notify entity 776 about the crash event. Vehicle crash prediction system 700 can also provide additional data, such as motion data (e.g., orientation, speed, acceleration, direction of travel, etc.), location data, etc., of vehicle 706 and vehicle 716 to entity 776 to aid an investigation operation to, for example, determine/confirm a severity of the crash event, determine/confirm the damage/injury caused by the crash event, to determine the liability of each driver involved in the crash event, etc.

In some examples, vehicle crash prediction system 700 can also use data from two vehicles to update a crash event prediction previously made based on data from a single vehicle, such as a prediction made by vehicle crash prediction system 300. For example, vehicle crash prediction system 300 of FIG. 3 may determine, based on data from vehicle 706, that vehicle 706 is not involved in a crash event. But then, based on data from vehicle 716, vehicle crash prediction system 700 of FIG. 7A may determine not only that vehicle 716 was involved in a crash event, but also that vehicle 706 is additionally involved in that same crash event. Based on such determination, vehicle crash prediction system 700 may reclassify an event involving vehicle 706 as a vehicle crash event, and take additional actions, such as transmitting notification 778, notification 770, and/or notification 772.

In addition, in a case where vehicle 706 and vehicle 716 are insured by different insurance carriers, vehicle crash prediction system 700 can also facilitate transfer of the data related to the two vehicles between two different insurance carriers upon determining that both vehicles are involved in the same crash event. For example, in a case where vehicle 706 is insured by a first entity and vehicle 716 is insured by a second entity, vehicle crash prediction system 700 can provide all of the data from mobile device 704 to the first entity, which insures vehicle 706 (and in which mobile device 704 is located), and transmit at least some of the data from mobile device 714 (in vehicle 716 insured by a second entity) to a first server operated by the first entity. In addition, vehicle crash prediction system 700 can also provide all of the data from mobile device 714 to the second entity and at least some of the data from mobile device 704 to a second server operated by the second entity as well. The data provided to both entities can include motion data such as, for example, speed data, acceleration data, location data, point-of-impact data, etc., as well as other data that allow investigation/reconstruction of the events leading to the crash event, determination of a share of liability of each driver, damage, injury, etc. Other data of a driver that may not be needed for investigation of the crash events, such as personal identification data, business information such as insurance rate, deductibles, etc., can be withheld from the other driver's insurance carrier.

In some examples, vehicle crash prediction system 700 can also transmit a notification 719 to another mobile device associated with a vehicle that is not involved in the crash event, such as mobile device 720. Vehicle crash prediction system 700 may determine that mobile device 720 is within the vicinity of the single crash event, and identify the user of mobile device 720 as a potential witness. In some embodiments, the mobile device 720 is determined to be within a predetermined distance from the location of the crash event at the time when the crash event occurred. A notification 719 may be transmitted to mobile device 720 to solicit witness information about the crash event.

Although emergency service 780 and entity 776 are illustrated in FIG. 7A, embodiments of the present invention are not limited to this set of entities. In some embodiments, vehicle crash prediction system 700 can be utilized to provide information to two insurance carriers, for example, a first insurance carrier that insures vehicle 706 and a second insurance carrier that insures vehicle 716. In some embodiments, a single insurance carrier is provided information in place of both emergency service 780 and entity 776. Thus, as described more fully herein, single crash event detection can leverage data collected by two mobile devices, each disposed in one of two vehicles involved in the single crash event. Leveraging data from both mobile devices, improved crash reconstruction processes can be implemented.

Figure 8A:
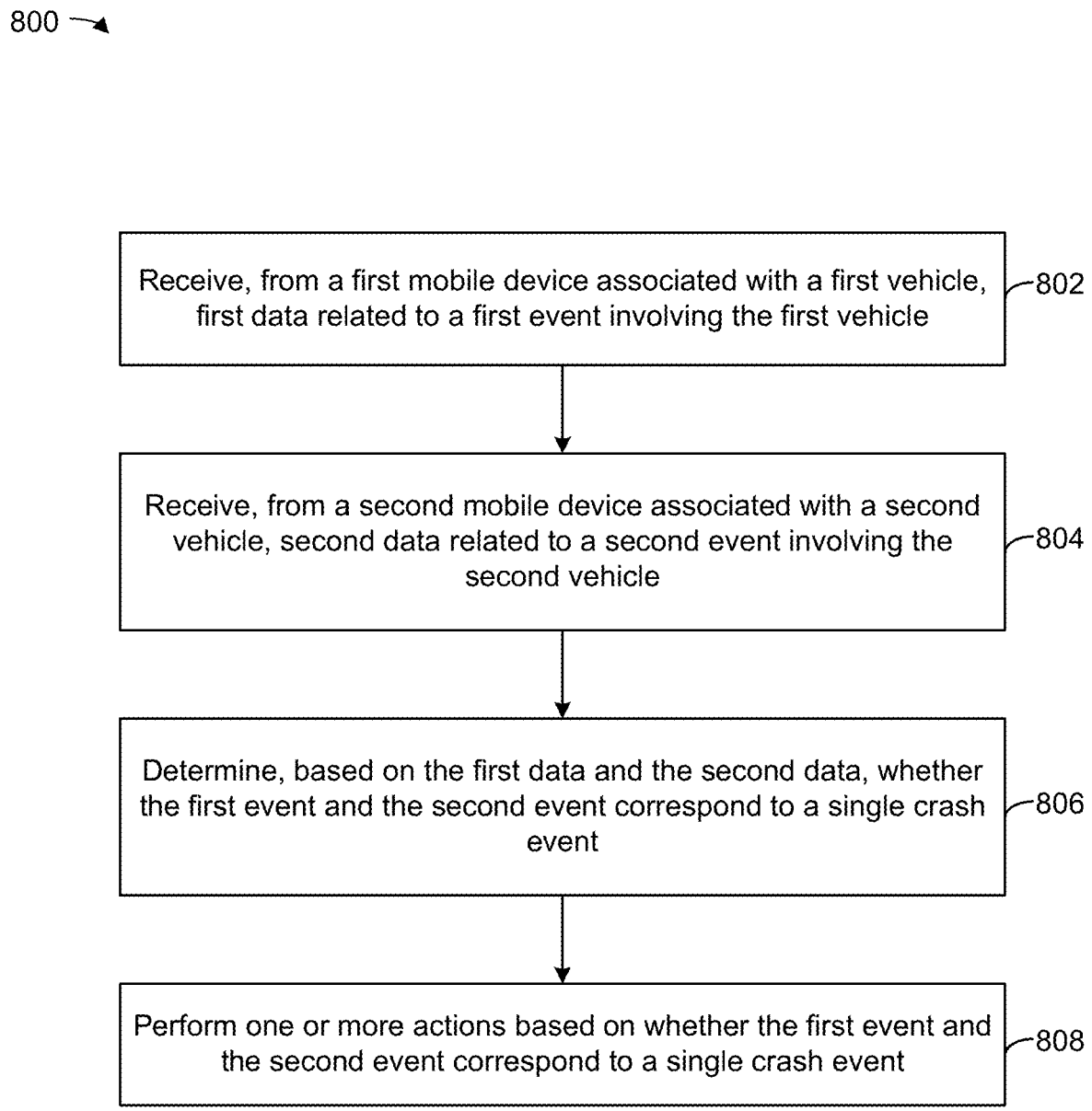
FIG. 8A illustrates a flowchart of an exemplary process for predicting whether events involving two vehicles correspond to the same crash event according to some aspects of the present disclosure.

FIG. 8A illustrates a flowchart of an exemplary process 800 for predicting whether events involving two vehicles correspond to the same crash event. Process 800 may be performed by a vehicle crash prediction system, such as vehicle crash prediction system 700. Vehicle crash event prediction process 800 can be performed by a server in a cloud infrastructure (e.g., electronic device 204). At block 802, process 800 involves receiving, from a first mobile device associated with a first vehicle, first data related to a first event involving the first vehicle. At block 804, process 800 involves receiving, from a second mobile device associated with a second vehicle, second data related to a second event involving the second vehicle. The first data and the second data may be received by a vehicle crash prediction system, such as vehicle crash prediction system 700.

The first data and the second data can include various data collected by sensor data blocks, such as sensor data block 108, of each device associated with the first and second vehicles. The collected sensor data may include data such as location and speed data (e.g., from GPS receiver 112), acceleration data (e.g., from accelerometer 116), orientation data (e.g., from magnetometer 120 and gyroscope 124), direction of travel data (e.g., from compass 136), or any similarly suitable data collectable by the one or more sensors of the mobile device. In some examples, the first data and the second data can include the times and the locations of the suspected crash events, probabilities that the suspected crash events are actual crash events, as well as additional information of the suspected crash events such as point-of-impacts, severity of the impacts, and/or motion states of the vehicles at the suspected crash events. Based on the first data and the second data, features for determining a single crash event between the first and second vehicles may be determined. The features may include a location difference/relative location (e.g., distance, altitude difference, etc.) between the two events, a time difference between the two events, point-of-impacts of the two vehicles at the two events, severity of the impacts at the two events, and/or the direction/speed of travel of the two vehicles at the two events.

At block 806, process 800 involves determining, based on the first data and the second data, whether the first event and the second event correspond to the same crash event. This determination may be made by a vehicle crash prediction system, such as vehicle crash prediction system 700. For example, vehicle crash prediction system 700 can input the first data and the second data into a crash prediction model to determine a probability of the two events corresponding to the same crash event. The probability can be determined based on determining a degree of alignment among various characteristics of the two events, such as a location difference/relative location (e.g., distance, altitude difference, etc.) between the two events, a time difference between the two events, the point-of-impacts of the two vehicles at the two events, the severity of the impacts at the two events, and/or the direction/speed of travel of the two vehicles at the two events. The determination of whether the first event and the second event correspond to the same crash event may then be based on whether the probability exceeds a threshold.

Figure 9A:
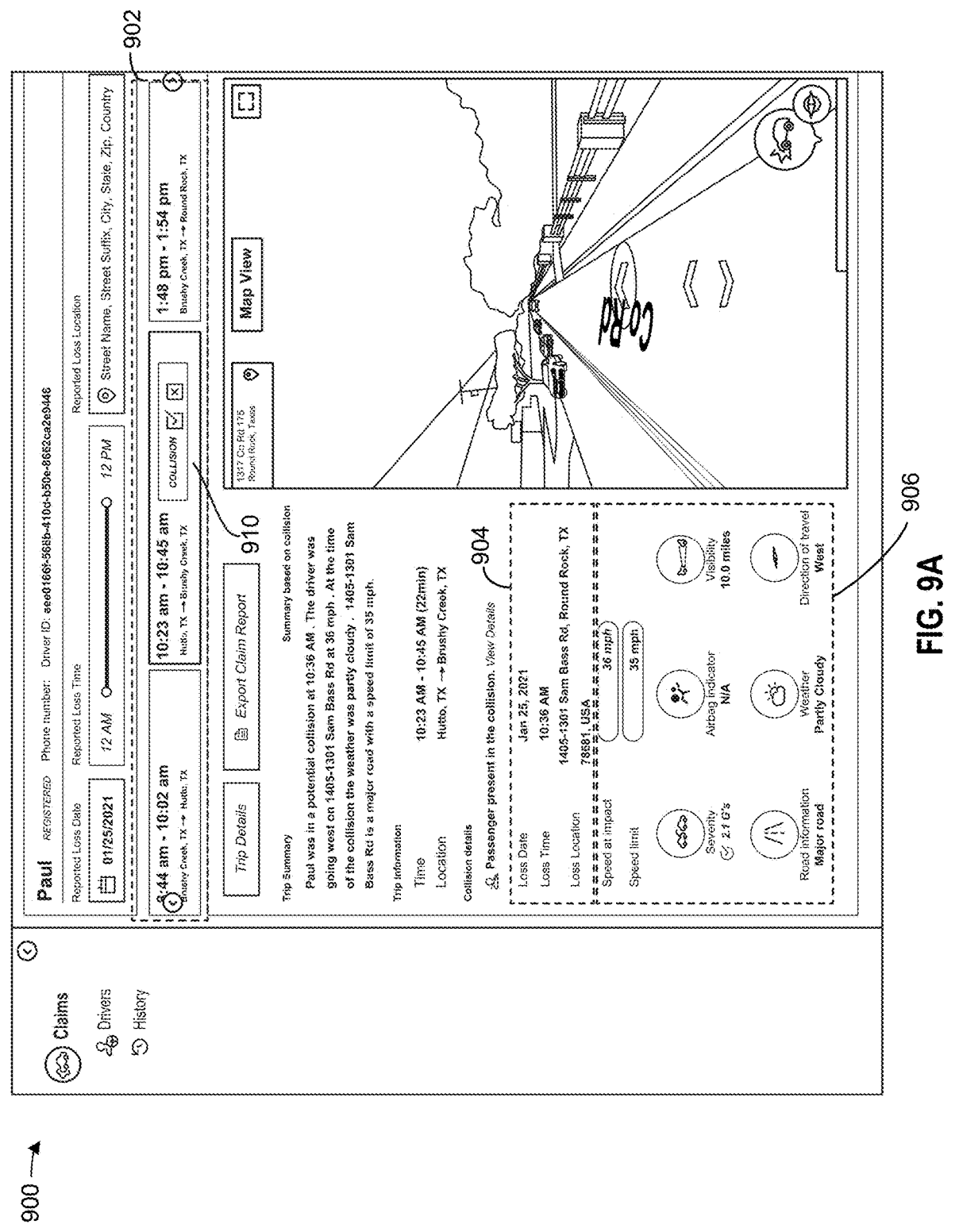
Figure 9B:
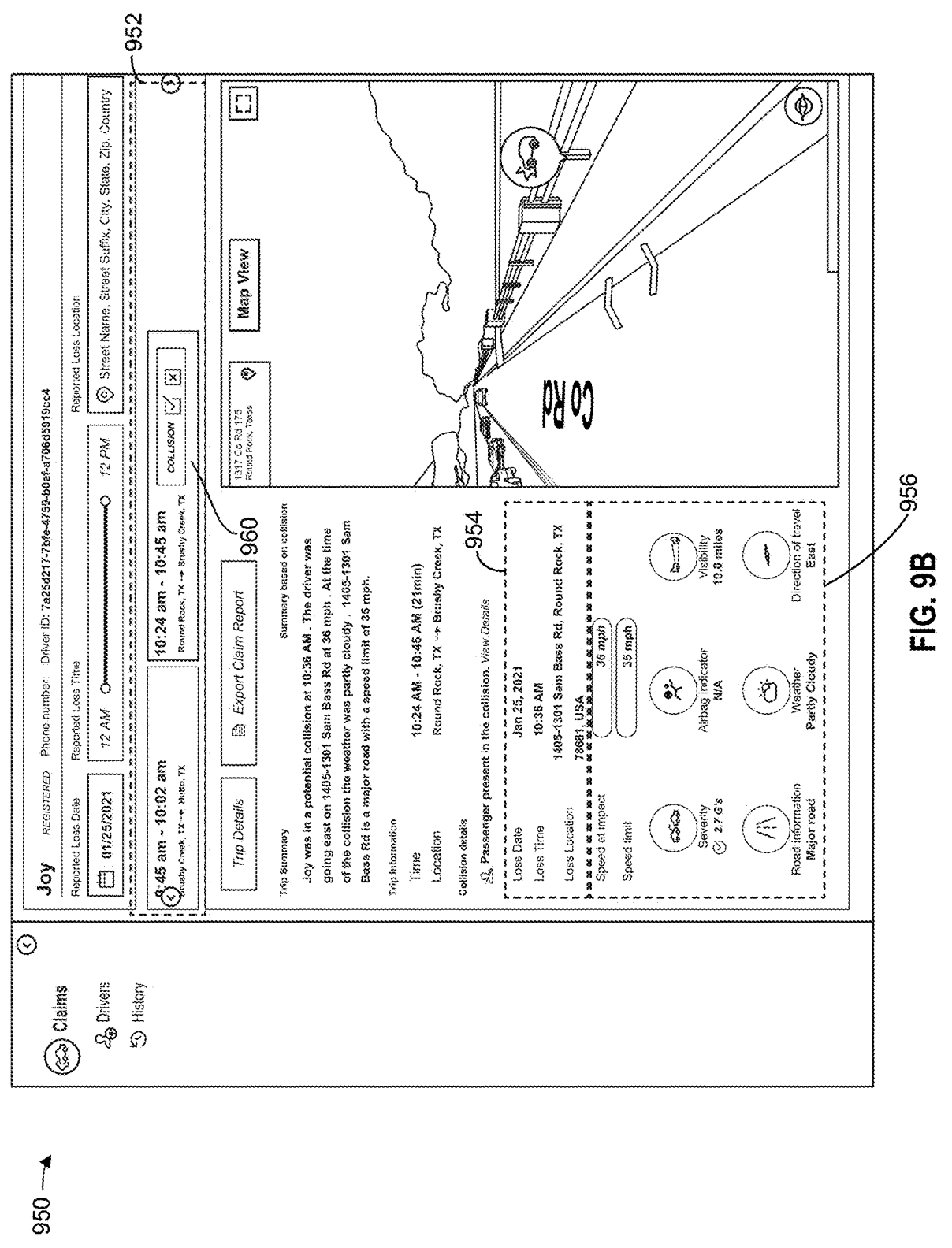

At block 808, process 800 involves performing one or more actions based on whether the first event and the second event correspond to the same crash event. The one or more actions may be performed by a vehicle crash prediction system, such as vehicle crash prediction system 700. One potential action that can be taken if the probability that a single crash event has occurred based on data from two detected crash events is to combine information from the two events into a combined data file that can be provided to insurance carriers for the vehicles involved in the single event. As an example, if it is determined that a probability of the two events corresponding to the same crash event is greater than a threshold, then information related to the first vehicle could be provided to the insurance carrier for the second vehicle and information related to the second vehicle could be provided to the insurance carrier for the first vehicle. An example of this data sharing is illustrated in FIGS. 9A and 9B, which illustrate web portals associated with two vehicles and drivers. The web portals may be a part of an insurance claim adjuster portal of an insurance provider.

It should be appreciated that the specific steps illustrated in FIG. 8A provide a particular method for predicting whether events involving two vehicles correspond to the same crash event according to an embodiment of the present invention. Other sequences of steps may also be performed according to alternative embodiments. For example, alternative embodiments of the present invention may perform the steps outlined above in a different order. Moreover, the individual steps illustrated in FIG. 8A may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 8B:
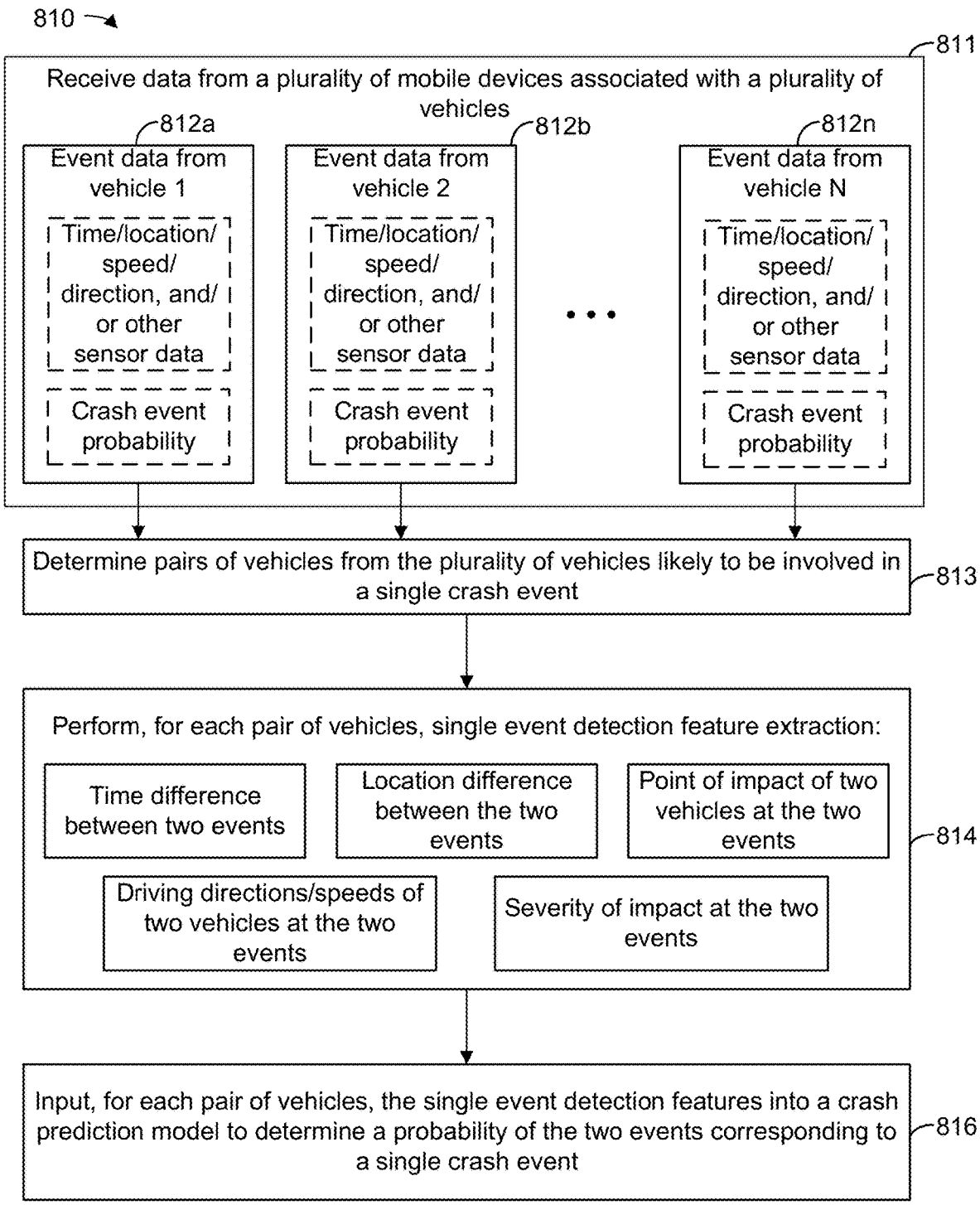
FIG. 8B illustrates a flowchart of an exemplary process for predicting single crash events based on data from a plurality of vehicles according to some aspects of the present disclosure.

FIG. 8B illustrates a flowchart of an exemplary process 810 for predicting single crash events based on data from a plurality of vehicles. At block 811, process 810 involves receiving data from a plurality mobile devices associated with a plurality of vehicles. For example, a vehicle crash prediction system, such as vehicle crash prediction system 700, may receive data 812 associated with a plurality of vehicles, such as data 812a, data 812b, and data 812n, each including different types of sensor data (e.g., time, location, speed, direction, etc.) collected at a particular suspected crash event, and a probability of each suspected crash event being an actual crash event.

At block 813, process 810 involves determining pairs of vehicles from the plurality of vehicles likely to be involved in the same crash event. A vehicle crash prediction system, such as vehicle crash prediction system 700, can identify candidate pairs of vehicles that are likely to be involved in the same crash event. The identification can be based on, for example, a degree of alignment in time/space between two events involving the two vehicles. The threshold degree of alignment for identifying candidate pairs of vehicles can be lower than the threshold degree of alignment for determining that two vehicles are in fact involved in a single vehicle crash, such that one vehicle can be paired with multiple vehicles.

At block 814, process 810 involves performing, for each pair of vehicles, single event detection feature extraction. After pairs of vehicles are identified, a vehicle crash prediction system, such as vehicle crash prediction system 700, can determine, for each pair of vehicles, features for determining a single crash event. As explained above, the features can include a location difference/relative location (e.g., distance, altitude difference, etc.) between two events, a time difference between two events, point-of-impacts of two vehicles at the two events, severity of impacts at the two events, direction/speed of travels of the two vehicles at the two events (e.g., the relative velocities), etc.

At block 816, process 810 involves inputting, for each pair of vehicles, the single event detection features into a crash prediction model to determine a probability of the two events corresponding to the same crash event. For example, a vehicle crash prediction system, such as vehicle crash prediction system 700, can input the single event detection features from block 814 into a crash prediction model to determine a probability of the two events corresponding to the same crash event. The probability can be determined based on determining a degree of alignment among various characteristics of the two events, such as a location difference/relative location (e.g., distance, altitude difference, etc.) between two events, a time difference between two events, point-of-impacts of two vehicles at the two events, severity of impacts at the two events, and/or the direction/speed of travel of the two vehicles at the two events. The threshold degree of alignment for determining that two vehicles are in fact involved in a single vehicle crash can be higher than the threshold degree of alignment for identifying candidate pairs of vehicles.

It should be appreciated that the specific steps illustrated in FIG. 8B provide a particular method for predicting single crash events based on data from a plurality of vehicles according to an embodiment of the present invention. Other sequences of steps may also be performed according to alternative embodiments. For example, alternative embodiments of the present invention may perform the steps outlined above in a different order. Moreover, the individual steps illustrated in FIG. 8B may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 8C:
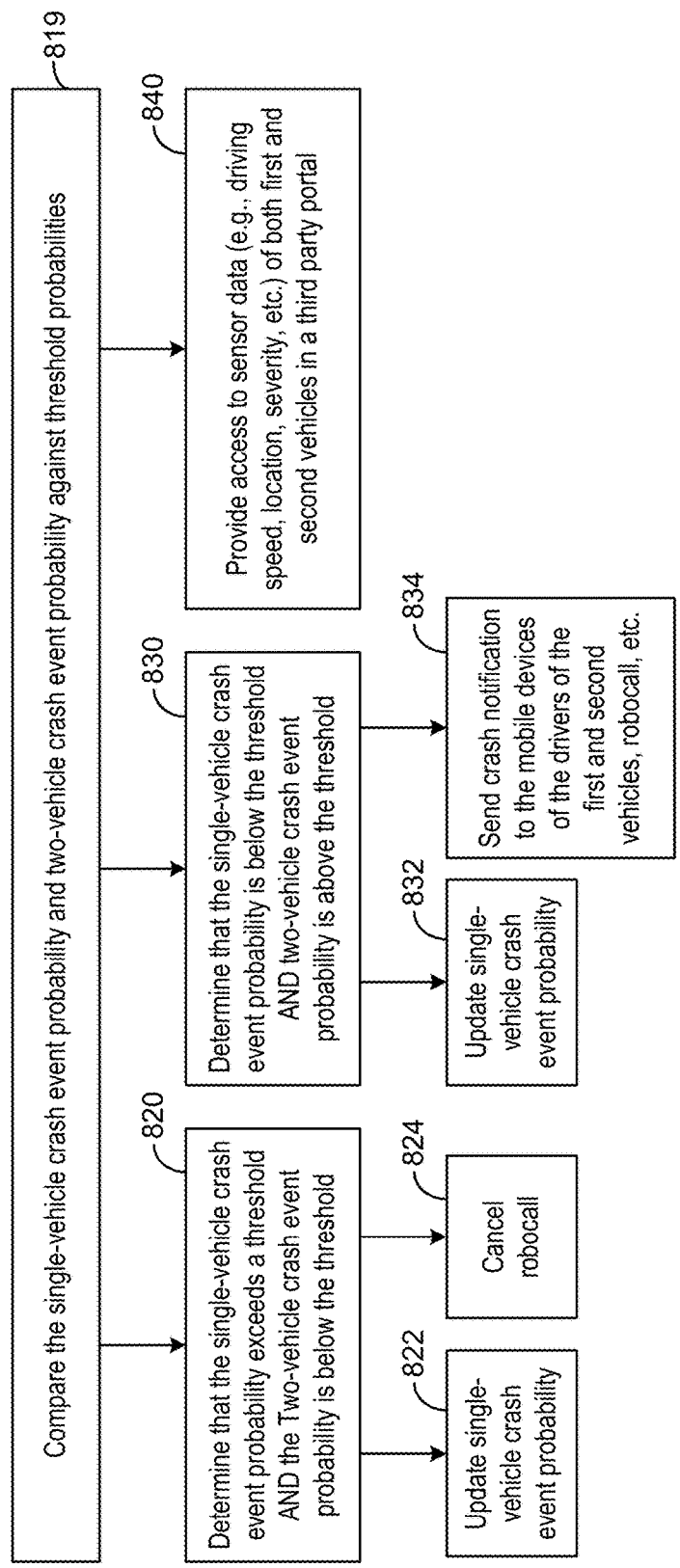
FIG. 8C illustrates a flowchart of an exemplary process for performing actions based on determining that the first event and the second event correspond to the same crash event according to some aspects of the present disclosure.

FIG. 8C illustrates a flowchart of an exemplary process 818 for performing actions based on determining that the first event and the second event correspond to the same crash event. At block 819, process 818 involves comparing the single-vehicle crash event probability and the two-vehicle crash event probability against threshold probabilities. Each mobile device may store a crash event probability generated based on single vehicle data, as described above in relation to FIGS. 3-6B, indicating the likelihood that a vehicle was involved in a crash. Further, as described in relation to FIGS. 8A-8B, a vehicle crash prediction system may generated a crash event probability generated based on vehicle data from two vehicles indicating the likelihood that both vehicles were involved in the same crash. Using these two separate probabilities, a vehicle crash prediction system, such as vehicle crash prediction system 700, can compare the crash event probability provided by the mobile device with a threshold, and compare the crash event probability based on data from a pair of vehicles with a threshold, and perform one or more actions based on the comparison results.

For example, at block 820, process 818 involves determining that the single-vehicle crash event probability exceeds a threshold and the two-vehicle crash event probability is below the threshold. Determining that the crash event probability from the mobile device exceeds the threshold while the two-vehicle crash event probability is below the threshold, may indicate that the single-vehicle crash event probability is not reliable, and that the vehicle was not involved in a crash. At block 822, in response to the determination at block 820, process 818 involves updating the single vehicle crash event probability. For example, a vehicle crash prediction system can update the single-vehicle crash event probability stored in the mobile device based on the two-vehicle crash event probability to indicate that the vehicle was not involved in a crash. At block 824, process 818 may also involve canceling a robocall. For example, a robocall to emergency services initiated based on the single-vehicle crash probability may be canceled based on the two-vehicle crash event probability being below the threshold.

As another example, at block 830, process 818 involves determining that the single-vehicle crash event probability is below the threshold and the two-vehicle crash event probability is above the threshold. Determining that the crash event probability from the mobile device is below the threshold while the two-vehicle crash event probability is above the threshold may also indicate that the single-vehicle crash event probability is not reliable, and the vehicle actually was involved in a crash. At block 832, in response to the determination at block 830, process 818 involves updating the single-vehicle crash event probability. For example, a vehicle crash prediction system can update the single-vehicle crash event probability stored in the mobile device based on the two-vehicle crash event probability to indicate that the vehicle was involved in a crash. At block 834, process 818 may also involve sending a crash notification to the mobile device of the drivers of the first and second vehicles and/or initiating a robocall to emergency services.

At block 840, process 818 involves providing access to information, such as the sensor data of both the first and second vehicles, in a third party portal. The sensor data may include, for example, the speeds of the two vehicles, the location of the crash, the severity of the crash, point of impact data, and/or any similarly suitable information pertaining to the details of a crash. The third party portal may be a portal operated by an entity, such as an insurance entity or insurance agent. The access can be provided based on the two-vehicle crash event probability exceeding the threshold, or exceeding a second threshold that is not enough to trigger notifications to the drivers' mobile devices or to emergency services. In addition, a vehicle crash prediction system, such as vehicle crash prediction system 700, may also perform other actions, such as transferal of vehicle data between the different insurance carriers of the vehicles, sending notifications to mobile devices of vehicles not involved in the single crash event to solicit for witness information, etc.

It should be appreciated that the specific steps illustrated in FIG. 8C provide a particular method for performing actions based on determining that the first event and the second event correspond to the same crash event according to an embodiment of the present invention. Other sequences of steps may also be performed according to alternative embodiments. For example, alternative embodiments of the present invention may perform the steps outlined above in a different order. Moreover, the individual steps illustrated in FIG. 8C may include multiple sub-steps that may be performed in various sequences as appropriate to the individual step. Furthermore, additional steps may be added or removed depending on the particular applications. One of ordinary skill in the art would recognize many variations, modifications, and alternatives.

FIG. 9A illustrates an example of a web portal 900 and FIG. 9B illustrates an example of a web portal 950 according to embodiments of the present invention. As illustrated in FIG. 9A, web portal 900 provides information related to a first driver (e.g., "Paul") and as illustrated in FIG. 9B, web portal 950 provides information related to a second driver (e.g., "Joy"). Both web portal 900 and web portal 950 can be updated based on the output of a vehicle crash prediction system, such as vehicle crash prediction system 700. As explained more fully below, web portal 900 and web portal 950 provide information related to a single event from two perspectives, namely the perspective of the first driver and the perspective of the second driver, respectively. In some examples, the information can also be made available in an insurance company's platform via an Application Programming Interface (API). Web portal 900 and web portal 950 can be operated by, for example, an insurance provider, an investigator, etc. In many cases, web portal 900 will be operated by a first insurance company and web portal 950 will be operated by a second insurance company.

Referring to FIG. 9A, web portal 900 displays a collision/crash report for a first driver based on sensor data and/or a single-vehicle crash probability provided by the mobile device of the first driver. Web portal 900 can include a section 902 to display the trip details, a section 904 to display the time and location of a crash event, as well as a section 906 to display other details of the suspected crash event, such as severity, deployment (if any) of one or more airbags, speed, travel direction, and the like. As shown in section 906 of FIG. 9A, the first driver was travelling west at a speed of 36 mph when the crash event occurred.

A vehicle crash prediction system, such as vehicle crash prediction system 700, can also receive sensor data and/or a single-vehicle crash probability provided by the mobile device of second driver. As illustrated in FIG. 9B, web portal 950 can include a section 952 to display the trip details, a section 954 to display the time and location of a crash event, as well as a section 956 to display other details of the suspected crash event, such as severity, deployment (if any) of one or more airbags (e.g., based on airbag pressure data), speed, travel direction, and the like. As shown in section 956 of FIG. 9B, the second driver was travelling east at a speed of 36 mph when the crash event occurred.

Using vehicle data pairing operations and degree of alignment operations, as described above, a vehicle crash prediction system, such as vehicle crash prediction system 700, may determine that the crash event reported by the second driver is the same crash event reported by the first driver. As a result, in the collision/crash report of the first driver displayed in web portal 900, the vehicle crash prediction system may add a link 910 to the crash event report of the first driver. Upon receiving a selection of link 910, web portal 900 can be used to display the collision/crash report associated with the first driver's vehicle, as shown in FIG. 9B. Similarly, upon receiving a selection of link 960, web portal 950 can be used to display the collision/crash report associated with the first driver's vehicle. Thus, the crash event report of the first driver includes a link to provide access to the second driver's crash event report, and vice versa.

Accordingly, web portal 900 can be utilized by a first carrier, for example, the carrier insuring the first driver and web portal 950 can be utilized by a second carrier, for example, the carrier insuring the second driver, to analyze the single crash event involving both vehicles. Moreover, information related to the single crash event can be shared between carriers to facilitate accident reconstruction from the perspective of either mobile device or a combined perspective based on data obtained by both mobile devices. By enabling carriers to view information related to the single crash event from multiple perspectives, embodiments of the present invention provide efficiencies and accuracy not available using conventional systems, particularly systems utilizing data from only a single mobile device. One of ordinary skill in the art would recognize many variations, modifications, and alternatives.

Point-of-Impact Detection

A point-of-impact of a collision may be determined using sensor measurements from one or more sensors of a mobile device and a machine-learning model. Training the machine-learning model may include: receiving a plurality of sets of sensor measurements (e.g., from a central database or from a plurality of mobile devices) in which each set of sensor measurements is associated with a collision. A set of motifs may be identified from the plurality of sets of sensor measurements using a pattern analysis model such as a matrix profile model or the like. The set of motifs may be labeled (e.g., identifying a collision type associated with each motif) and used to train the machine-learning model. At a later time when a collision is detected, a new set of sensor measurements may be received from one or more sensors of a mobile device. The machine-learning model may be executed using the new set of sensor measurements to predict a point-of-impact of the collision. The mobile device may then transmit a notification indicative of the predicted point-of-impact of a remote device for further processing, for example, to obtain authorization for particular vehicle repairs or the like.

Figure 10:
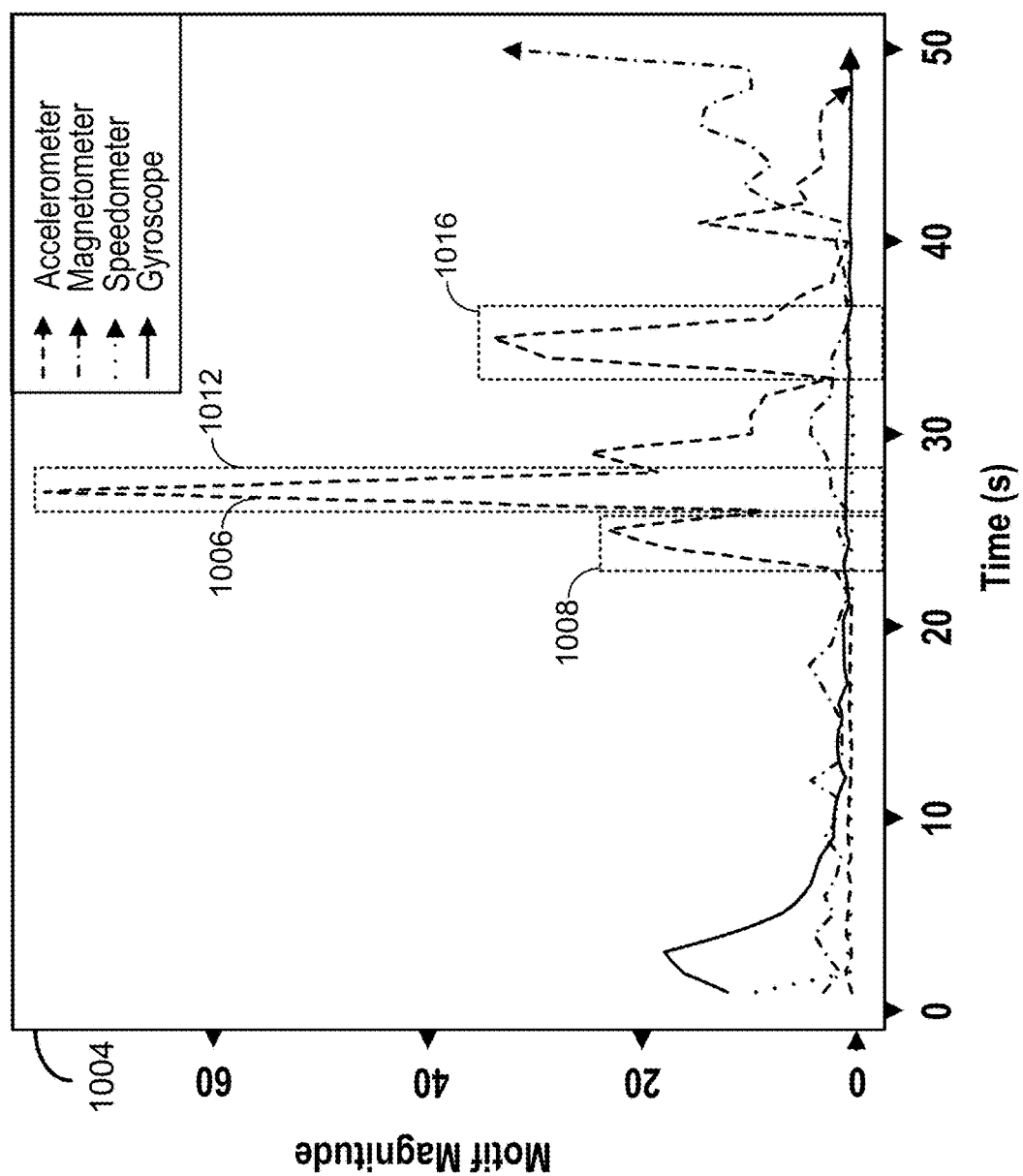
FIG. 10 illustrates a graph of motifs of sensor measurements that are indicative of a front-impact collision according to some embodiments.

FIG. 10 illustrates a graph 1004 of motifs of sensor measurements that are indicative of a front-impact collision according to some embodiments. The ordinate of graph 1004 represents the motif magnitude while the abscissa of graph 1004 indicates the time in seconds. Sensor measurements may be collected over a time interval (e.g., such as a time interval that includes a trip) from one or more sensors of a mobile device. A pattern analysis model may extract one or more motifs from the sensor measurements that correspond to a particular sensor type (e.g., accelerometer sensors, magnetometer sensors, or the like). A motif may represent a pattern of sensor data of a particular sensor type identified by the pattern analysis model. Motifs may represent a subset of the sensor measurements over a time interval (e.g., a window). The time interval may be of a standardized size (e.g., all motifs correspond to sensor data over a time interval of a same length) or an arbitrary size. For instance, the time interval may correspond to a length of the pattern identified by the pattern analysis model such that some patterns may correspond to a larger time interval than others.

Graph 1004 represents four motifs extracted from sensor measurements over a time interval. Each motif may correspond to sensor measurements of a same or different sensor type. For instance, motif 1006, represented by the dashed line (e.g., pattern 1), may correspond to accelerometer measurements. Other motifs, such as a GPS motif, a magnetometer motif, and/or a speedometer motif, may also be used to predict the point of impact of a collision. As illustrated in graph 1004, motif 1006 exhibits a sharp increase in magnitude observable during a first time period 1008 with an even larger increase observable during a second time period 1012. The smaller increase in magnitude observed during the first time period 1008 may correspond to a hard braking event in which the driver suddenly applied the brakes to slow down (or another event such as a swerve intended to avoid the collision). The larger increase in magnitude observed during the second time period 1012 may correspond to a collision (e.g., a sudden change in acceleration resulting from an impact). A smaller magnitude increase prior to a larger magnitude increase may be indicative of a front-end collision in which the driver detected the impending collision and applied the brakes to reduce or prevent the collision. Another increase in magnitude may be observed during a third time period 1016 in which the vehicle came to a rest after the collision (e.g., the driver applied the brakes or the vehicle was stopped as a result of the collision).

The smaller increase during the first time period 1008 may be indicative of a driver detecting that a collision was imminent and attempting to avoid or reduce the impact of the collision. The point-of-impact may correspond to a location within the field of view of the driver (e.g., front impact, or a side-impact that is located towards the front of the driver's vehicle). The point-of-impact may be processed by a machine-learning model to identify the point-of-impact. The machine-learning model may process the first motif and other sensor data that can be used to determine a location or change in location of the vehicle. The machine-learning model may determine whether the collision was a front-impact or side-impact using the first motif and the other sensor measurements by, for example, determining if lateral movement of the vehicle could be observed (from the data). If GPS measurements indicate a lateral change in position in addition to the first motif, the collision may correspond to a side-impact. If no lateral movement could be observed, then the point-of-impact was a front-impact collision.

The machine-learning model may be trained using the motifs that are labeled (e.g., indicating if the motif corresponds to a no collision, a front-impact collision, a side-impact collision, or a rear-impact collision). The machine-learning model may be a non-binary predicative classifier that generates three or more prediction types. Each prediction type may correspond to a likelihood of no collision, a front-impact collision, a side-impact collision, or a rear-impact collision. In some instances, the predicative classifier may also output a confidence that indicates a probability that a corresponding prediction is correct. For instance, if sensor data of the mobile device collected during a collision closely matches features learned from motifs of front-impact collisions, then the confidence associated with a prediction of front-impact collision may be high. If the sensor data does not closely match those features, then the confidence associated with a prediction of front-impact collision may be low.

Figure 11:
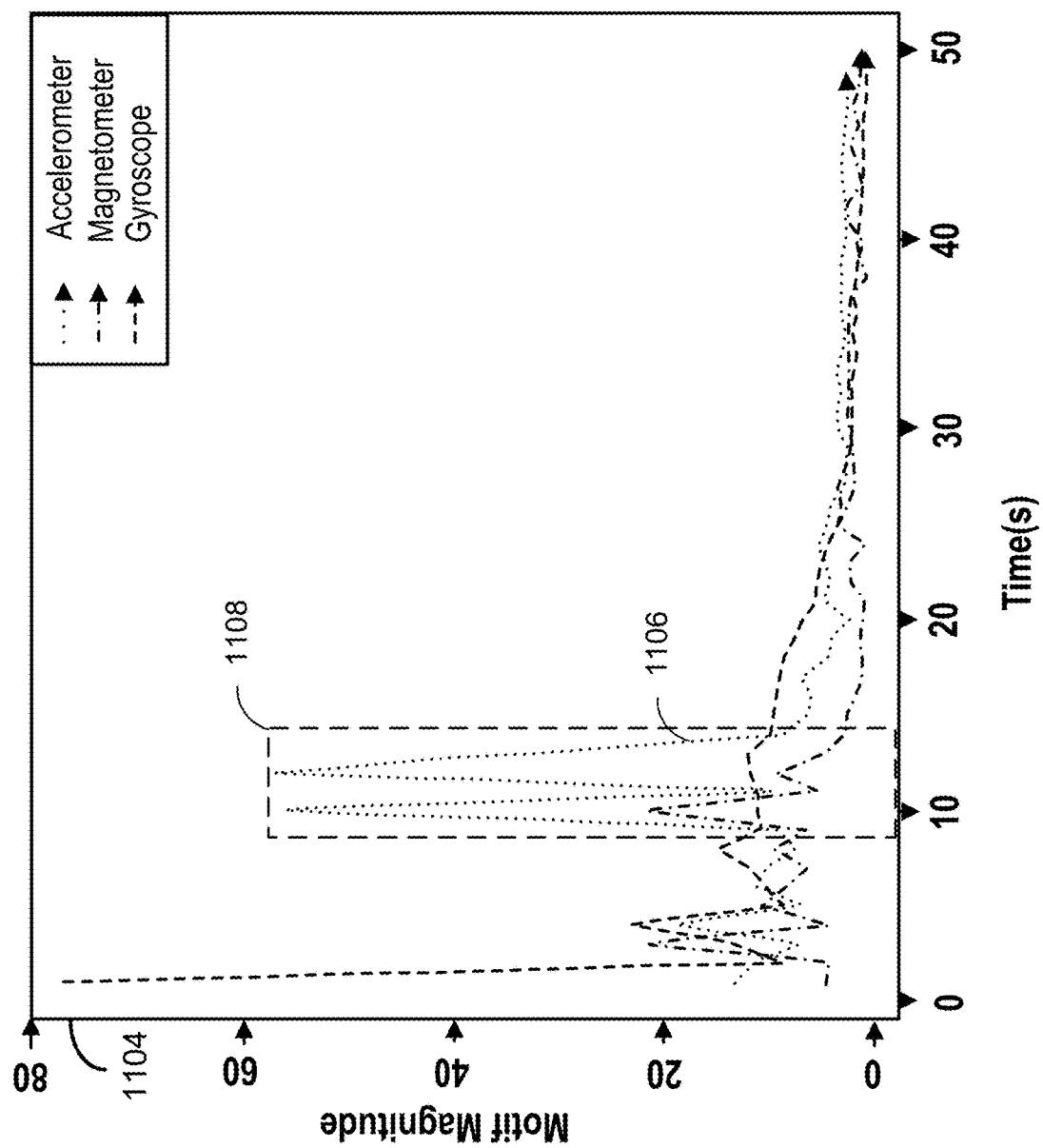
FIG. 11 illustrates a graph of motifs of sensor measurements that are indicative of a rear-impact collision according to some embodiments.

FIG. 11 illustrates a graph 1104 of motifs of sensor measurements that are indicative of a rear-impact collision according to some embodiments. The ordinate of graph 1104 represents the motif magnitude while the abscissa of graph 1104 indicates the time in seconds. Like graph 1004, graph 1104 represents a plurality of motifs identified by a pattern analysis model from sensor measurements. Each motif represents a pattern of sensor measurements that correspond to a particular sensor type. For instance, motif 1106, represented by the dotted line, may correspond to accelerometer measurements. A sharp increase in magnitude may be observed during time period 1108 corresponding to a collision (e.g., a sudden change in acceleration sensor measurements indicative of a quick deceleration). Unlike motif 1006 illustrated in FIG. 10, motif 1106 does not indicate activity prior to the collision that may be indicative of a breaking event or other accident mitigation event.

The lack of activity occurring prior to the collision during time period 1108 may indicate that the driver did not detect that a collision was imminent. As a result, the driver did not take any action to avoid or mitigate the collision such as applying the brakes or otherwise attempting to avoid the collision. The point-of-impact associated with motif 1106 may correspond to a location that is not easily observable by the driver such as a rear-impact collision or a side-impact collision (e.g., in a blind spot, or the like). Motif 1106 may be passed as input into the machine-learning model. The machine-learning model may determine whether the collision was a rear-impact or side-impact using the motif 1106 and the other sensor measurements by, for example, determining if lateral movement of the vehicle could be observed from the data. For instance, if GPS measurements indicate a lateral change in position in addition to the motif 1106, which indicates a change in forward motion of the vehicle, the collision may correspond to a side-impact. If no lateral movement could be observed, then the point-of-impact was likely a rear-impact collision.

Figure 12:
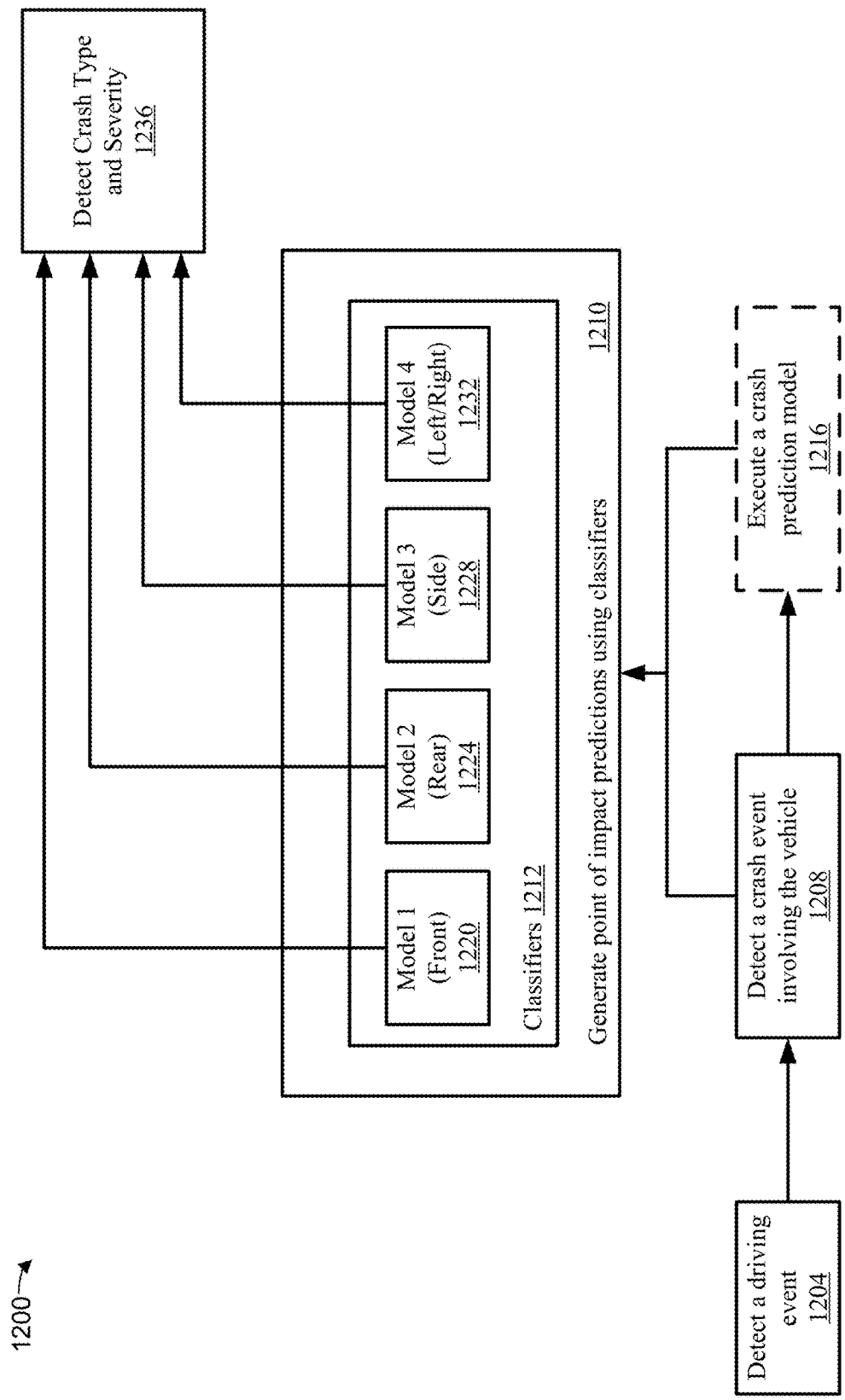
FIG. 12 illustrates a flowchart of an exemplary process for predicting the type and severity of a crash using a machine-learning system according to some embodiments.

FIG. 12 illustrates a flowchart of an exemplary process 1200 for predicting the type and severity of a crash using a machine-learning system according to some embodiments. At block 1204, process 1200 involves detecting a driving event. The machine-learning system begins detecting collisions and the point-of-impact of a detected collision upon detecting the initiation of a drive event. In some instances, the sensors of the mobile device may be used to determine that a drive has initiated. For example, the mobile device may detect that a geofence surrounding the mobile device and/or the car has been crossed (e.g., using a GPS sensor). Alternatively or additionally, the mobile device may use other sensors such as, for example, accelerometer measurements, magnetometer measurements, and/or gyroscope measurements. A driving event may be detected if the sensor measurements are greater than a respective predetermined threshold. Alternatively, the initiation of the drive may be determined by user input from the driver or passenger.

At block 1208, process 1200 involves detecting a crash event (e.g., a collision) involving the vehicle. The crash event may be detected using sensor measurements collected by the mobile device. For example, the mobile device may determine that, for example, a crash event occurred when accelerometer measurements, magnetometer measurements, and/or gyroscope measurements are greater than a respective predetermined threshold. Alternatively, the mobile device may determine that a crash event occurred based on user input (e.g., from a driver or passenger of the vehicle or a driver or passenger of another vehicle).

In some embodiments, after detecting that a crash event involving the vehicle has occurred, the mobile device may define a window that corresponds to a time interval that begins at a predetermined time before the crash event (e.g., 1 second, 30 seconds, 1 minute, etc.) and ends at a predetermined time after the crash event (e.g., when the vehicle stops moving according to sensor measurements, when user input is received, 30 seconds after the crash event is detected, etc.). The sensor measurements collected during the window may then be transmitted to classifiers for detecting the point-of-impact.

At block 1216, process 1200 involves executing a crash prediction model. In some instances, the crash prediction (e.g., machine-learning) model uses the sensor measurements collected during the window defined around the crash event at block 1208. The crash prediction model may use the sensor measurements as input and generate a prediction indicative of whether a crash event occurred. The crash prediction model may include a confidence value that indicates the likelihood that the crash prediction is accurate. The crash prediction model may also generate a crash feature vector. The crash feature vector may include features that are indicative of a particular point-of-impact and exclude features that are not indicative of a point-of-impact. For instance, a longitudinal absolute maximum acceleration magnitude may be indicative of a frontal crash and therefore included in the feature vector. The crash feature vector may include accelerometer measurements, magnetometer measurements, gyroscope measurements, phone-car alignment measurements (e.g., direction and magnitude of acceleration measurements relative to a particular direction of the vehicle such as longitude and lateral), combinations thereof, and the like.

The feature vector may also include features derived by the crash prediction model for determining the point-of-impact of the collision. The derived features can include, but are not limited to spike time difference (e.g., a time difference between an occurrence of local extremum of speed from the GPS and acceleration from IMU), features derived from pressure measurements (e.g., change in pressure relative to changes in GPS and acceleration in time), and the like.

At block 1210, process 1200 involves generating point of impact predictions using classifiers 1212. Classifiers 1212 may include a set of binary classifiers that each generate a Boolean (e.g., true/false) prediction of a particular point-of-impact. For example, in a single classifier configuration (not shown), a classifier may predict frontal impact using model 1 (front) 1220 such that a frontal prediction true is indicative of a frontal-impact collision and a frontal prediction of false is indicative of a rear-impact collision. The one or more binary classifiers can include a model 1 (front) 1220 which predicts a frontal collision, model 2 (rear) 1224 that predicts a rear collision, model 3 (side) 1228 that predicts a side impact (e.g., lateral impact), and model 4 (left/right) 1232 that predicts whether the point-of-impact was on the left or the right of the vehicle (e.g., may not execute or the output may be ignored if model 3 (side) outputs false). Other classifiers may also be included to increase the resolution of the predictions. Each model may be trained using unsupervised, supervised (e.g., using labeled crash data), or semi-supervised learning. In some instances, each classifier may be trained using the same method (e.g., each classifier may be trained using supervised learning). Alternatively, each classifier may be trained based on the method best suited to train the classifier such that some classifiers may be trained using supervised learning while other classifiers may be trained using unsupervised learning.

At block 1236, process 1200 involves detecting a crash type and severity for the collision. The output from each of the one or more binary classifiers may be combined to derive an overall point-of-impact prediction indicative of crash type and severity. For example, if model 1 (front) 1220 outputs true, model 2 (rear) 1224 outputs false, model 3 (side) 1228 outputs true, and model 4 (left/right) 1232 outputs left then the combined point-of-impact prediction indicates a front, left-side impact on the vehicle. The point-of-impact may be used to determine the cause of the collision based on the particular point-of-impact. For example, a frontal impact may be more likely to have been caused by (or not avoided by) the driver of the vehicle while a side or rear collision are more likely to be the cause of another vehicle.

The point-of-impact prediction along with the crash feature vector or sensor measurements may be used to estimate a severity of the crash and determine if further action is to be executed. A set of thresholds for determining collision severity may be defined. The mobile device may determine severity by determining the largest threshold of the set of thresholds that is exceeded by one or more sensor measurements. For instance, if a first (low) threshold is exceeded, but not a second higher threshold, then it may be determined that the collision severity is low. Any number of thresholds may be defined to finely determine accident threshold.

The output of classifiers 1212, the point-of-impact prediction, sensor measurements, and/or crash feature vector may be transmitted to a user (e.g., the driver or passenger of the vehicle, another remote user, emergency services, etc.) or a remote server for verification of the crash event and/or storage in association with a driver profile. In some instances, the mobile device may automatically initiate a crash reporting process with some predefined information (e.g., such as the point-of-impact, crash severity, driver information, passenger information, vehicle information, other drivers/passengers involved in the crash event, other vehicles involved in the crash event, combinations thereof, and the like).

It should be appreciated that the specific steps illustrated in FIG. 12 provide a particular method for predicting the type and severity of a crash using a machine-learning system according to an embodiment of the present invention. Other sequences of steps may also be performed according to alternative embodiments. For example, alternative embodiments of the present invention may perform the steps outlined above in a different order. Moreover, the individual steps illustrated in FIG. 12 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 13:
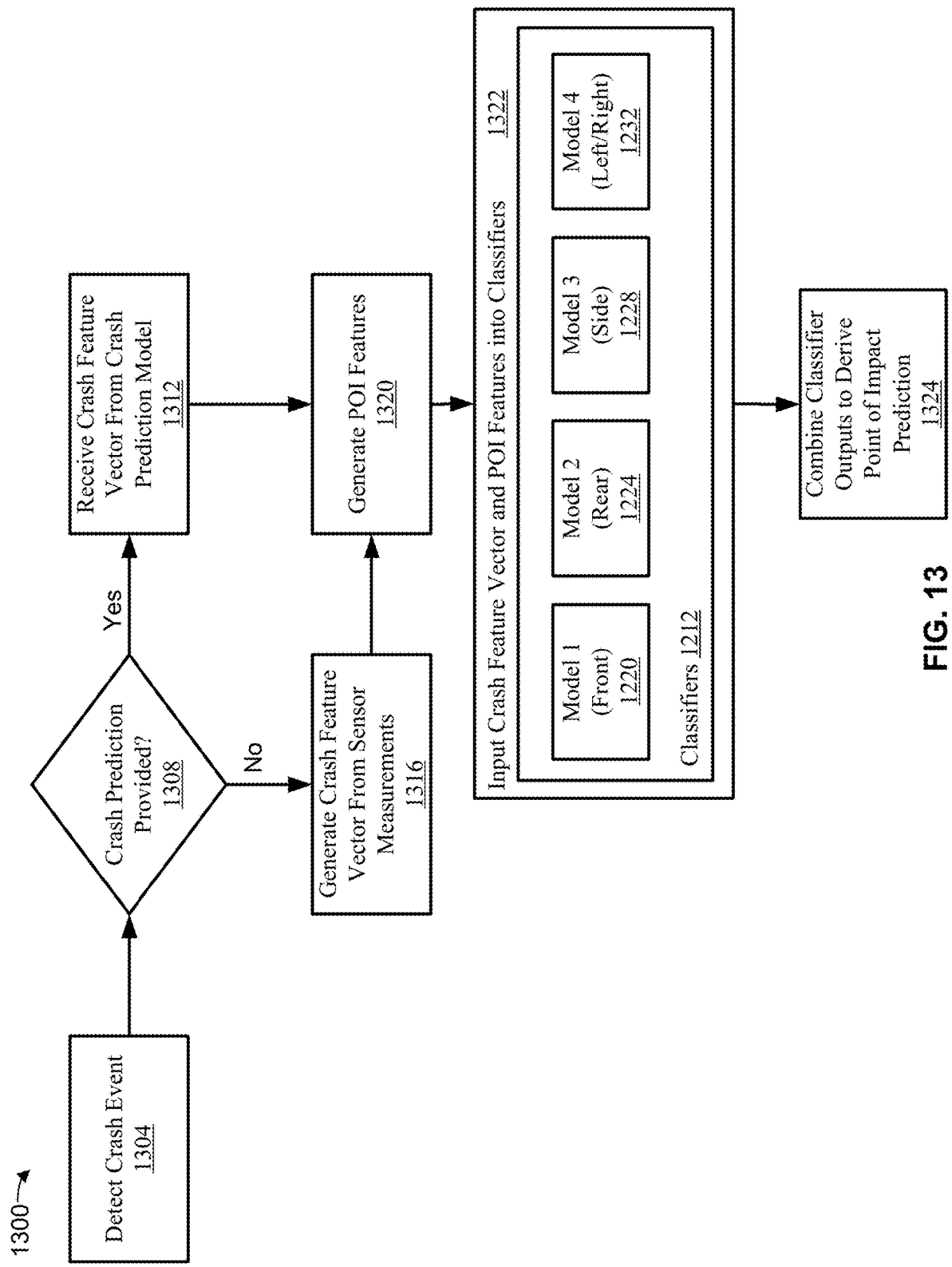
FIG. 13 illustrates a flowchart of an exemplary process for detecting a point-of-impact using machine-learning according to some embodiments.

FIG. 13 illustrates a flowchart of an exemplary process 1300 for detecting a point-of-impact using machine-learning according to some embodiments. At block 1304, process 1300 involves detecting a crash event. The crash event may be detected using sensor measurements collected by a mobile device within a vehicle. For example, a crash event may be detected upon determining that accelerometer measurements, magnetometer measurements, and/or gyroscope measurements are greater than a respective predetermined threshold. Alternatively, the mobile device may determine that a crash occurred based on user input (e.g., from a driver or passenger of the vehicle or a driver or passenger of another vehicle).

At a block 1308, process 1300 involves determining whether a crash prediction is provided. A crash prediction may be provided by a crash prediction (machine-learning) model. The crash prediction model may execute using the sensor measurements collected by the mobile device to predict whether the crash event occurred. The crash prediction model may also output a crash feature vector for use by classifiers 1212. If at block 1308, it is determined that crash prediction is provided then the process shifts to block 1312 (via the Yes branch).

At block 1312, if the crash prediction is provided, process 1300 involves receiving the crash feature vector from the crash prediction model. The crash feature vector may include a set of features used to generate a crash prediction. One or more features included in the crash feature vector may be used by classifiers 1212 to determine a point-of-impact. Since the crash feature vector includes features usable to determine a crash prediction, the crash feature vector may include one or more additional features that may not be used by classifiers 1212.

At block 1316, if a crash prediction was not provided, process 1300 involves generating a crash feature vector from the sensor measurements. The sensor measurements may be used to generate some or all of the features of the crash feature vector. In some instances, the mobile device may generate a reduced feature vector that includes only those features needed for classifiers 1212 to determine a point-of-impact. For example, the crash prediction model may generate a feature vector usable to detect a crash event and/or crash severity. As a result, the crash feature vector may include additional features that may not be used (or usable) by classifiers 1212. If the mobile device derives the crash feature vector for classifiers 1212 from the sensor measurements, the mobile device need not derive each feature that would be generated by the crash prediction model since some of those features may not be used. The mobile device may only generate those features that may be used by classifiers 1212 to reduce the processing/resource load on the mobile device.

At block 1320, process 1300 involves generating point of impact features. One or more point of impact features may be derived from the crash feature vector and/or the senor measurements. For example, the mobile device may use the crash feature vector from the crash prediction model (e.g., from block 1312) or the derived crash feature vector by the mobile device (e.g., from block 1316) to derive features for determining a point-of-impact of the collision (e.g., point-of-impact features). The point-of-impact features can include, but are not limited to spike time difference (e.g., a time difference between an occurrence of local extremum of speed from the GPS and acceleration from IMU), features derived from pressure measurements (e.g., change in pressure relative to changes in GPS and acceleration in time), and the like. Alternatively, the mobile device may derive the point-of-impact features from the sensor measurements, or from a combination of the sensor measurements and the crash feature vector.

At block 1322, process 1300 involves inputting the crash feature vector and the point of impact features into the classifiers 1212. Classifiers 1212 may include one or more binary classifiers 1220-1232 (e.g., as described in connection with FIG. 12). The output of the classifiers 1212 includes one output per classifier included in classifiers 1212 (e.g., four outputs as shown, but other implementations may include more or fewer classifiers). Each classifier may use a subset of the crash feature vector and point-of-impact features. For instance, classifiers to determine a frontal collision may use a maximum velocity change in GPS spike time difference, maximum event window longitudinal delta, longitudinal fraction of maximum acceleration magnitude, max jerk GPS spike time differences, and/or longitudinal absolute maximum acceleration magnitude combinations thereof, and the like. Classifiers to determine a rear collision may use a longitudinal fraction of maximum acceleration magnitude, maximum velocity change in GPS spike time difference, max jerk GPS spike time differences, longitudinal absolute maximum acceleration magnitude, and/or GPS approximate speed curvature (e.g., speed relative to multiple axes) at impact, combinations thereof, and the like. Other features may be used in addition to or in place of those aforementioned features In some instances, the crash feature vector and/or point-of-impact features may be weighted using a value indicative of a relative importance of the particular feature for generating a particular classification. The features may be weighted based on the particular classifiers used to determine the point-of-impact prediction. For example, determining a frontal impact may use a subset of the set of features with each having a corresponding weight. Determining a rear impact may use a different (but overlapping) subset of the set of features with each feature having a different corresponding weight. In some instances, a feature may have a first weight when used to determine a front-impact collision and a different second weight when used to determine a rear-impact collision or side-impact collisions.

At block 1324, process 1300 involves combining the classifier outputs to derive a point of impact prediction. Each classifier may input a true/false indication of a particular type of collisions such as front, rear, side, left/right, and/or the like. The outputs can be combined to derive a particular point-of-impact of the collision. For example, if model 1 (front) 1220 outputs true, model 2 (rear) 1224 outputs false, model 3 (side) 1228 outputs true, and model 4 (left/right) 1232 outputs left then the combined point-of-impact prediction indicates a front, left-side impact on the vehicle. The point-of-impact prediction may be transmitted to a remote server. For example, the point-of-impact prediction may be stored in a profile (e.g., of the driver, passenger, or vehicle), transmitted to emergency services, or to a user (e.g., the driver, a passenger, an emergency contact, or the like) for verification, or the like. In some instances, the point-of-impact prediction may be used to automate (or initiate) a crash reporting process (e.g., for emergency services, insurance personnel, an emergency contact of the driver or passenger, or the like).

It should be appreciated that the specific steps illustrated in FIG. 13 provide a particular method for detecting a point-of-impact using machine-learning according to an embodiment of the present invention. Other sequences of steps may also be performed according to alternative embodiments. For example, alternative embodiments of the present invention may perform the steps outlined above in a different order. Moreover, the individual steps illustrated in FIG. 13 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 14:
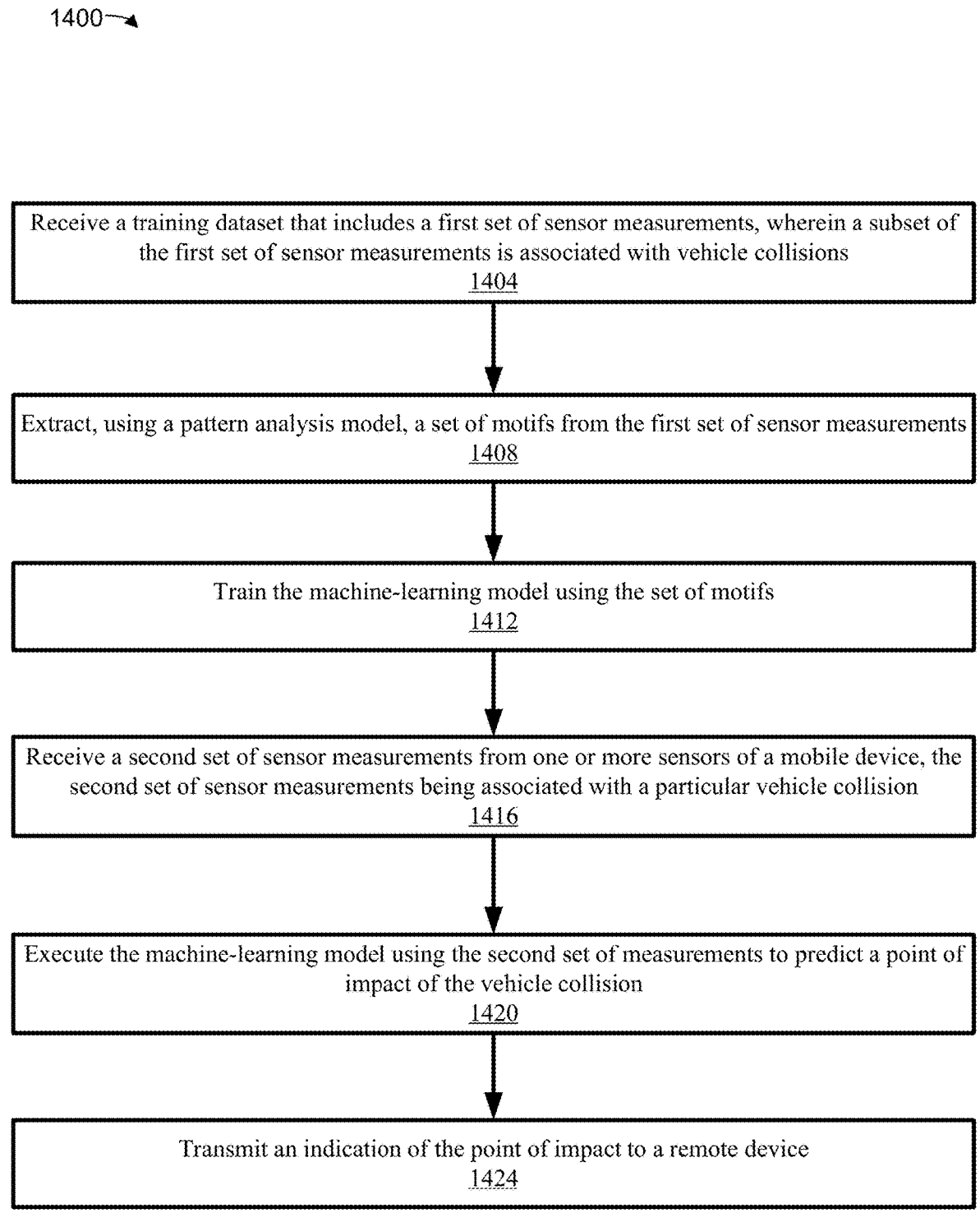
FIG. 14 illustrates a flowchart of an exemplary process for determining a point-of-impact of a collision on a vehicle according to some embodiments.

FIG. 14 illustrates a flowchart of an exemplary process 1400 for determining a point-of-impact of a collision on a vehicle according to some embodiments. At block 1404, process 1400 involves receiving a training dataset that includes a first set of sensor measurements, wherein a subset of the first set of sensor measurements is associated with vehicle collisions. The first set of sensor measurements may be received and/or collected from one or more sensors of a mobile device including an accelerometer sensor and a global positioning service (GPS) sensor. The first set of sensor measurements includes sensors measurements collected during each of multiple vehicle collisions. The sensor measurements may include accelerometers measurements and/or GPS measurements. In some instances, the sensor measurements may include additional sensors such as, but not limited to, any of the sensors of sensor data block 108 of FIG. 1.

At block 1408, process 1400 involves extracting, using a pattern analysis model, a set of motifs from the first set of sensor measurements. In some embodiments, each motif of the set of motifs corresponds to a pattern of sensor measurements that occur during a vehicle collision. A matrix profile model may be used to define motifs that represent repeated patterns in the first set of sensor measurements. In some instances, each motif may represent a repeated pattern identified in a subset of the first set of sensor measurements that corresponds to a sensor type.

For instance, an accelerometer motif represents a repeated pattern in accelerometer measurements. In some instances, a matrix profile model may extract a particular quantity of motifs or motifs that meet a particular criteria (e.g., such as motifs that are good representations of collisions or a type of collisions).

For instance, for front-end collisions (or side-impact collisions that may be in a field of view of the driver), the accelerometer sensor measurements may include a first increase in magnitude that corresponds to a breaking event (or swerving event) in which the driver attempts to avoid or mitigate the collisions followed by a second increase in magnitude that is larger than the first and corresponds to the collision. In some instances, a third increase in magnitude may be detected that corresponds to the vehicle coming to a rest after the collision. The pattern analysis model may identify that sensor measurements of front-end collisions often include similar increases in magnitude (e.g., the first increase magnitude followed by a larger second increase in magnitude and optionally the third increase in magnitude). The pattern analysis model generates one or more motifs that represent the repeated pattern (e.g., the first increase in magnitude followed by a larger second increase in magnitude and optionally the third increase in magnitude) that corresponds to front-end collisions.

In rear-end collisions (and side-impact collisions may be outside the field of view of the driver), the accelerometer sensor measurements may include an increase in magnitude that corresponds to a collision (e.g., no increase in magnitude corresponding to breaking events as the driver may have been unaware of the impending collision). The pattern analysis model may identify that sensor measurements of rear-end collisions often include similar increases in magnitude (e.g., a single increase in magnitude corresponding to a collision). The pattern analysis model generates one or more motifs that represent the repeated pattern that corresponds to rear-end collisions.

The pattern analysis model may be a matrix profile model. The matrix profile model may use a sliding window of any predetermined length to compute a vector of minimum normalized (e.g., relative to the z-axis) Euclidean distances. The distances enable the matrix profile model to identify motifs and discords (e.g., anomalies) in the input sensor measurements.

At block 1412, process 1400 involves training the machine-learning model using the set of motifs. The machine-learning model may be any type of machine-learning model. The machine-learning model may be trained using supervised or unsupervised learning. If supervised learning is used to train the machine-learning model, each motif may be labeled with a point-of-impact of the vehicle collision or a label indicative of no collision. The set of motifs may be passed as input into the machine-learning model with the corresponding labels. The machine-learning model may then learn features of the motifs that correspond to the labels to identify features that may be indicative of a point-of-impact. If unsupervised learning is used, a machine-learning model may identify relationships of features of motifs to determine correlated features and motifs. For instance, the machine-learning model may use a clustering algorithm such as k-means or the like.

At block 1416, process 1400 involves receiving a second set of sensor measurements from one or more sensors of a mobile device, associated with a particular vehicle collision. The second set of sensor measurements may be collected during a collision involving a vehicle, using sensors of a mobile device including at least one of an accelerometer sensor or a GPS sensor. In some embodiments, the mobile device is positioned within the vehicle during the collision and while the mobile device is collecting sensor measurements. In some instances, the second set of sensor measurements may be received in response to detecting an occurrence of a vehicle collision. For instance, sensor data may indicate an anomalous change in speed, location, or acceleration that is indicative of an occurrence of a collision. Alternatively, user input may be received that indicates a collision has occurred. In response to detecting the collision, the second set of sensor measurements may be received. Further, disclosure regarding crash detection can be found in U.S. Pat. No. 10,930,090, issued on Feb. 23, 2021, and entitled "METHOD AND SYSTEM FOR ACCIDENT DETECTION USING CONTEXTUAL DATA", hereby incorporated by reference in its entirety for all purposes.

At block 1420, process 1400 involves executing the machine-learning model using the second set of measurements to predict a point of impact of the vehicle collision. In some instances, the matrix profile model may first identify motifs in the second set of sensor measurements and the trained machine-learning model may be executed using the motifs instead. The trained machine-learning model may output a prediction of the point-of-impact of the collision (e.g., predicting that the point-of-impact was a front-impact, side-impact, or rear-impact collision). The machine-learning model may also output a confidence that indicates a probability that the prediction is accurate. For instance, the confidence may be based on how closely the input to the machine-learning model matches a motif labeled with the prediction. A prediction with a high confidence may provide an indication that the prediction is likely correct. A prediction with a low confidence may indicate that the prediction is less likely to be correct. As a result, a low confidence may cause the machine-learning model to be retrained.

At block 1424, process 1400 involves transmitting an indication of the point of impact to a remote device. In some instances, the predicted point-of-impact may be displayed to a user of the mobile device. A user may be prompted to enter user input to confirm the point-of-impact. This may occur when the confidence of the prediction is not greater than a first threshold. In other instances, such as when the confidence of the prediction is greater than the first threshold, the predicted point-of-impact may be transmitted to a remote device (e.g., such as to an insurance agent or the like). The predicted point-of-impact may be transmitted with other sensor and contextual data collected by the mobile device as part of the user reporting the collision or making a claim. For instance, the user, using the mobile device, may report the collision to the agent. The mobile device may predict the point-of-collision. The prediction may be packaged with other sensor data and/or contextual data (e.g., weather, traffic, time of day, time of year, location, address, length of drive prior to the collision, demographic data of the driver and/or passengers (if any), combinations thereof, or the like). The mobile device may automatically (or with user authorization) add the package to the report transmitted by the user reporting the collision.

In some embodiments, the predicted point of impact may be transmitted to a vehicle crash prediction system, such as vehicle crash prediction system 700, as described above. The predicted point of impact may be used, in conjunction with other sensor data, extracted features, and contextual data, to determine a probability that the vehicle was involved in a crash event. The predicted point of impact may also be paired with another predicted point of impact from a separate crash to determine the probability that the vehicle was involved in a collision with another vehicle. For example, as described above in relation to FIG. 7C, a prediction that a first vehicle was involved in a front-impact collision may be paired with a prediction that a second vehicle was involved in a rear-impact collision at approximately the same time and approximately the same place, indicating that the first vehicle rear-ended the second vehicle.

The process of FIG. 14 may then return to block 1416, in which the mobile device may wait for an additional set of sensor measurements. Repeating the process illustrated in FIG. 14 may allow for the machine-learning model to continue to improve the accuracy and precision of the predicted points of impact. In some embodiments, the process may terminate after transmitting the indication of the point of impact at block 1424.

It should be appreciated that the specific steps illustrated in FIG. 14 provide a particular method of detecting a point-of-impact of a vehicle collision according to an embodiment of the present invention. Other sequences of steps may also be performed according to alternative embodiments. For example, alternative embodiments of the present invention may perform the steps outlined above in a different order. Moreover, the individual steps illustrated in FIG. 14 may include multiple sub-steps that may be performed in various sequences as appropriate to the individual step. Furthermore, additional steps may be added or removed depending on the particular applications. One of ordinary skill in the art would recognize many variations, modifications, and alternatives.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), mask programmable gate array (MPGA), processors, controllers, micro-controllers, microprocessors, other electronic units designed to perform the functions described above, and/or combinations thereof.

Also, it is noted that the embodiments and/or examples may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, one or more of the operations may be performed out-of-order from the order depicted. A process may terminate when its operations are completed or return to a previous step or block. A process could have additional steps or blocks not included in the figure. A process may correspond to a method, a function, a procedure, a subroutine, a subprogram, etc. When a process corresponds to a function, its termination corresponds to a return of the function to a calling function or a main function.

Furthermore, the devices and/or systems described herein may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a non-transitory computer-readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc., may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any non-transitory computer-readable medium tangibly embodying instructions may be used in implementing the methodologies described herein. For example, software codes may be stored in a memory. Memory may be implemented within the processor or external to the processor. As used herein, the term "memory" refers to any type of volatile, non-volatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, cache memory, magnetic disk storage mediums, optical storage mediums, flash memory devices and/or other machine readable mediums for storing information. The term "computer-readable medium" includes, but is not limited to, portable or fixed storage devices, optical storage devices, and/or various other storage mediums capable of storing that contain or carry instruction(s) and/or data.

The examples and embodiments described herein are for illustrative purposes only. Various modifications or changes in light thereof will be apparent to persons skilled in the art. These are to be included within the spirit and purview of this application, and the scope of the appended claims, which follow.

What is claimed is:

1. A method comprising:
   receiving, by a vehicle crash prediction server system, event data for a plurality of events, wherein each event of the plurality of events is identified by a respective computing device disposed in a vehicle from movements of the vehicle collected by the respective computing device;
   determining, by the vehicle crash prediction server system, and for each unique pairing of events in the plurality of events, a degree of alignment based on a comparison between the event data for both events of the unique pairing of events;
   identifying, by the vehicle crash prediction server system, candidate pairs of events from the plurality of events based on a comparison between the degree of alignment for each unique pairing of events and an alignment threshold, wherein the degree of alignment for each candidate pair of events is greater than or equal to the alignment threshold;
   extracting, by the vehicle crash prediction server system, and for each candidate pair of events, a set of features from the event data for both events of the candidate pair of events;
   inputting, by the vehicle crash prediction server system, and for each candidate pair of events, the set of features for the candidate pair of events into a crash prediction model to determine a crash correlation probability indicating whether both events of the candidate pair of events correspond to a same crash event;
   determining, by the vehicle crash prediction server system, and for each candidate pair of events, whether the crash correlation probability exceeds a crash correlation threshold; and
   transmitting, by the vehicle crash prediction server system, an indication of the same crash event to a remote server system associated with either or both vehicles involved in the same crash event in response to determining that the crash correlation probability exceeds the crash correlation threshold.

2. The method of claim 1, further comprising:
   providing, by the vehicle crash prediction server system, a first graphical user interface (GUI) including the event data for a first event of the plurality of events, wherein the first GUI is updated to include a link to view the event data a second event of the plurality of events in response to determining that the crash correlation probability for the first event and the second event exceeds the crash correlation threshold.

3. The method of claim 1, wherein:
   the remote server system is a first server system different than the vehicle crash prediction server system;
   the event data for a first subset of the plurality of events is received from the first server system;
   the event data for a second subset of the plurality of events is received from a second server system different than the first server system and the vehicle crash prediction server system; and
   for pairs of events received from the first server system and the second server system, transmitting the indication to the first server system comprises transmitting the event data received from the second server system to the first server system.

4. The method of claim 1, wherein the event data for each event of the plurality of events includes time-series data including at least one of: speed data, acceleration data, orientation data, direction of travel data, location data, pressure data, or audio data.

5. The method of claim 4, wherein the event data for each event of the plurality of events is generated by at least one of: a global positioning system (GPS), an accelerometer, a magnetometer, or an inertial measurement unit (IMU) of the vehicle.

6. The method of claim 1, wherein the event data for each event of the plurality of events includes a crash event probability generated by the respective computing device from the movements of the vehicle collected by the respective computing device, wherein the crash event probability indicates whether the event is a crash event involving the vehicle.

7. The method of claim 6, wherein the crash event probability for each event of the plurality of events is stored in the respective computing device, and the method further comprises:
   updating, by the vehicle crash prediction server system, the crash event probability stored in the respective computing device based on the crash correlation probability.

8. The method of claim 1, wherein the degree of alignment between a first event and a second event includes a time difference between a first time when the first event occurred and a second time when the second event occurred.

9. The method of claim 1, wherein the degree of alignment between a first event and a second event includes a relative distance between a first location where the first event occurred and a second location where the second event occurred.

10. The method of claim 1, wherein:
    the event data for each event of the plurality of events includes speed data and acceleration data of the vehicle in which the respective computing device was disposed; and
    the method further comprises:
    determining, for each event of the plurality of events a time window around the event based on detecting changes in the speed data and fitting a linear graph over at least a part of the speed data.

11. The method of claim 10, further comprising:
    determining, for each event of the candidate pairs of events, a point-of-impact of the vehicle based on a subset of the acceleration data; and
    wherein the set of features for a pair of events comprise a degree of alignment between the point-of-impact for both events and relative directions of travel between both vehicles.

12. The method of claim 10, further comprising:
    determining, for each event of the candidate pairs of events, a degree of severity of impact based on a subset of the acceleration data; and wherein the set of features includes a degree of alignment among the degree of severity of both events and relative velocities of both vehicles.

13. The method of claim 10, wherein the set of features includes at least one of: a slope of the speed data for both events, a length of the time window for both events, locations of both vehicles, lateral accelerations of both vehicles, or longitudinal accelerations of both vehicles.

14. The method of claim 10, wherein the set of features includes a distance travelled by either or both vehicles after the event.

15. A vehicle crash prediction system, comprising:
one or more processors; and
a memory storing instructions that, when executed by the one or more processors, cause the system to:
receive, event data for a plurality of events, wherein each event of the plurality of events is identified by a respective computing device disposed in a vehicle from movements of the vehicle collected by the respective computing device;
determine, for each unique pairing of events in the plurality of events, a degree of alignment based on a comparison between the event data for both events of the unique pairing of events;
identify candidate pairs of events from the plurality of events based on a comparison between the degree of alignment for each unique pairing of events and an alignment threshold, wherein the degree of alignment for each candidate pair of events is greater than or equal to the alignment threshold;
extract, for each candidate pair of events, a set of features from the event data for both events of the candidate pair of events;
input, for each candidate pair of events, the set of features for the candidate pair of events into a crash prediction model to determine a crash correlation probability indicating whether both events of the candidate pair of events correspond to a same crash event;
determine, for each candidate pair of events, whether the crash correlation probability exceeds a crash correlation threshold; and
transmit an indication of the same crash event to a remote server system associated with either or both vehicles involved in the same crash event in response to determining that the crash correlation probability exceeds the crash correlation threshold.

16. The system of claim 15, wherein the instructions further cause the system to:
provide a first graphical user interface (GUI) including the event data for a first event of the plurality of events, wherein the first GUI is updated to include a link to the event data of a second event of the plurality of events in response to determining that the crash correlation probability for the first event and the second event exceeds the crash correlation threshold.

17. The system of claim 15, wherein the set of features include at least one of: a degree of alignment between a point of impact determined for both events; a difference between locations where both events occurred; a difference between times at which both events occurred; a degree of alignment between severities determined for both events; directions traveled by both vehicles leading up to both events; or speeds of both vehicles.

18. One or more non-transitory computer-readable storage media storing instructions that, upon execution by one or more processors of a vehicle crash prediction system, cause the one or more processors to perform operations comprising:
receiving event data for a plurality of events, wherein each event of the plurality of events is identified by a respective computing device disposed in a vehicle from movements of the vehicle collected by the respective computing device;
determining, for each unique pairing of events in the plurality of events, a degree of alignment based on a comparison between the event data for both events of the unique pairing of events;
identifying candidate pairs of events from the plurality of events based on a comparison between the degree of alignment for each unique pairing of events and an alignment threshold, wherein the degree of alignment for each candidate pair of events is greater than or equal to the alignment threshold;
extracting, for each candidate pair of events, a set of features from the event data for both events of the candidate pair of events;
inputting, for each candidate pair of events, the set of features for the candidate pair of events into a crash prediction model to determine a crash correlation probability indicating whether both events of the candidate pair of events correspond to a same crash event;
determining, for each candidate pair of events, whether the crash correlation probability exceeds a crash correlation threshold; and
transmitting an indication of the same crash event to a remote server system associated with either or both vehicles involved in the same crash event in response to determining that the crash correlation probability exceeds the crash correlation threshold.

19. The one or more non-transitory computer-readable storage media of claim 18, wherein the operations further comprise:
providing a first graphical user interface (GUI) including the event data for a first event of the plurality of events, wherein the first GUI is updated to include a link to the event data of a second event of the plurality of events in response to determining that the crash correlation probability for the first event and the second event exceeds the crash correlation threshold.

20. The one or more non-transitory computer-readable storage media of claim 18, wherein the set of features includes at least one of: a degree of alignment between a point of impact determined for both events; a difference between locations where both events occurred; a difference between times at which both events occurred; a degree of alignment between severities determined for both events; directions traveled by both vehicles leading up to both events; or speeds of both vehicles.

* * * * *